(12) United States Patent
Chew

(10) Patent No.: US 10,067,489 B2
(45) Date of Patent: Sep. 4, 2018

(54) INFORMATION INTEGRATION SYSTEM AND METHODOLOGY

(71) Applicant: COMMISSIONING AGENTS, INC., Indianapolis, IN (US)

(72) Inventor: Robert E. Chew, Indianapolis, IN (US)

(73) Assignee: COMMISSIONING AGENTS, INC.

( * ) Notice: Subject to any disclaimer, the term of this patent is extended or adjusted under 35 U.S.C. 154(b) by 620 days.

(21) Appl. No.: 14/729,468

(22) Filed: Jun. 3, 2015

(65) Prior Publication Data

US 2015/0346705 A1 Dec. 3, 2015

Related U.S. Application Data

(60) Provisional application No. 62/007,241, filed on Jun. 3, 2014.

(51) Int. Cl.
| | | |
|---|---|---|
| G05B 19/00 | (2006.01) | |
| G05B 19/042 | (2006.01) | |
| G05B 19/418 | (2006.01) | |
| G06Q 10/06 | (2012.01) | |
| G05B 23/00 | (2006.01) | |

(52) U.S. Cl.
CPC ... *G05B 19/0426* (2013.01); *G05B 19/41875* (2013.01); *G05B 23/00* (2013.01); *G06Q 10/06313* (2013.01); *G06Q 10/06395* (2013.01); *G05B 2219/23291* (2013.01); *G05B 2219/31395* (2013.01); *G05B 2219/31449* (2013.01); *Y02P 90/86* (2015.11)

(58) Field of Classification Search
None
See application file for complete search history.

(56) References Cited

U.S. PATENT DOCUMENTS

| | | | |
|---|---|---|---|
| 6,466,935 B1 | 11/2002 | Stuart | |
| 6,957,186 B1 | 10/2005 | Guheen et al. | |
| 7,529,642 B2* | 5/2009 | Raymond | G05B 21/02 702/182 |
| 8,781,882 B1* | 7/2014 | Arboletti | G06Q 10/0639 705/7.11 |
| 2003/0015660 A1* | 1/2003 | Shishido | H01L 21/67276 250/311 |
| 2004/0028268 A1* | 2/2004 | Popp | G06T 7/70 382/141 |
| 2004/0030426 A1* | 2/2004 | Popp | A61F 13/15772 700/97 |
| 2004/0030431 A1* | 2/2004 | Popp | A61F 13/15772 700/109 |
| 2004/0030433 A1* | 2/2004 | Popp | A61F 13/15772 700/109 |

(Continued)

FOREIGN PATENT DOCUMENTS

WO 2007017738 A2 2/2007

OTHER PUBLICATIONS

International Search Report and Written Opinion for corresponding PCT/US2015/033949, dated Sep. 4, 2015.

*Primary Examiner* — Gurkanwaljit Singh
(74) *Attorney, Agent, or Firm* — Barnes & Thornburg LLP

(57) ABSTRACT

A software and hardware implemented solution that enables manufacturing organizations to manage knowledge, manage information, comply with regulations, and operate regulated manufacturing in a more efficient and technically innovative way.

48 Claims, 33 Drawing Sheets

(56) References Cited

U.S. PATENT DOCUMENTS

| | | | |
|---|---|---|---|
| 2004/0030436 A1* | 2/2004 | Popp | A61F 13/15772 700/111 |
| 2007/0050070 A1* | 3/2007 | Strain | G06Q 10/06 700/99 |
| 2010/0153183 A1* | 6/2010 | Ulwick | G06Q 10/0631 705/7.12 |
| 2010/0205208 A1 | 8/2010 | Walker | |
| 2010/0287036 A1 | 11/2010 | Guinta et al. | |
| 2011/0071871 A1 | 3/2011 | Wong et al. | |
| 2012/0066019 A1* | 3/2012 | Hinshaw | G06Q 10/06 705/7.23 |
| 2012/0323628 A1 | 12/2012 | Jaster et al. | |
| 2013/0080293 A1* | 3/2013 | Khin | G06Q 30/06 705/26.81 |
| 2014/0075004 A1* | 3/2014 | Van Dusen | H04L 41/04 709/223 |
| 2015/0066592 A1* | 3/2015 | Ehm | G06Q 30/0202 705/7.31 |
| 2016/0321594 A1* | 11/2016 | Linde | G06Q 10/06395 |

* cited by examiner

FIG. 7

Attribute Details (for the selected product attribute)

Product Attribute: Aggregation

Analytical Method: QC-101    Critical: ☑

Impact / Risk Low: The impact on a user (patient) if this attribute is too low.

Impact High: The impact on a user (patient) if this attribute is too high.

INFORMATION INTEGRATION SYSTEM AND METHODOLOGY

CROSS-REFERENCE TO RELATED APPLICATION(S)

This application relies for priority on U.S. Provisional Patent Application Ser. No. 62/007,241, entitled "INFORMATION INTEGRATION SYSTEM AND METHODOLOGY," and filed on Jun. 3, 2014, the entirety of which being incorporated by reference herein.

FIELD

Disclosed embodiments relate to software implemented solutions for building, customizing, documenting and managing processes related to regulatory requirements required for manufacturing in compliance with national and international standards and regulations.

BACKGROUND

Regulatory requirements related to equipment design and qualification, facilities design and qualification, personnel, procedures, training, process control, quality risk management, process validation, maintenance, and quality systems are defined in various national regulations. However, the volume of requirements and range of information and data required to be managed by compliance with such requirements can often be too burdensome for compliance by enterprises operating in heavily regulated environments.

For example, the regulatory requirements related to equipment design and qualification, facilities design and qualification, personnel, procedures, training, process control, quality risk management, process validation, maintenance, and quality systems are defined in various national regulations.

Further, international standards and guidance documents provide further approaches adopted by much of the pharmaceutical and biotech industry and generally followed by regulators. These different dimensions of regulatory requirements are tightly inter-related: training to procedures, training to personnel qualification, equipment design and qualification to process user requirements and quality risk control, maintenance and calibration to process user requirements and quality risk control, etc.

There are a number of conventional information technology solutions developed that support many of these requirements, but few of those solutions deal with multiple requirements.

For example, TrackWise® is an enterprise quality management software solution from Sparta Systems that optimizes quality systems management across a range of industries.

Trackwise® provides corrective and preventive actions, process deviations, training records, other compliance tracking.

Maximo® (and many other Computerized Maintenance Management Software applications) provide maintenance and calibration scheduling and record keeping.

Documentum® is an enterprise content management platform that provides document management.

Further, various other conventional IT solutions provide automated qualification and validation protocol development and still further conventional solutions provide equipment and instrument data tracking during construction and turnover as well as generation of verification forms.

Additionally, there are various conventional IT products that manage training records and spreadsheets of many varieties that are conventionally used for quality risk assessments and risk controls.

SUMMARY

However, the conventionally available solutions available to enterprises for managing data, process flows, security, documentation, etc. are akin to silo-centric tools that focus on a single or limited area of functionality in the absence of other related functionality that must, therefore, be managed in a cumbersome, disintegrated manner.

Accordingly, there is a need for improved technological systems, components, and methodologies that enables manufacturing organizations to manage knowledge, manage information, comply with regulations, and operate Good Manufacturing Practice (GMP)-regulated manufacturing in a more efficient and technically innovative way.

Further, disclosed embodiments provide an information technology solution that integrates a number of conventional processes in a novel manner necessary to specify, develop, construct, qualify, validate, and operate manufacturing facilities (e.g., drug manufacturing facilities, for example, manufacturing facilities that manufacture active drug substances or dosages or other product regulated by US Food and Drug Administration (FDA) or international GMP regulations). The scope of disclosed embodiments is designed to integrate data and manage processes within the manufacturing process, operation of the facility, and the physical plant—equipment and automation.

BRIEF DESCRIPTIONS OF THE FIGURES

The detailed description particularly refers to the accompanying figures in which:

FIG. 1, a full scale operation involves various data and processes for processes, people, and physical plants and infrastructure.

FIG. 7 is an illustration of front end interface details that enable the linking of attributes to quality processes and to products.

FIG. 8 is an illustration of front end interface functionality that enables the ability to manage attributes and product details.

FIG. 9 is an illustration of front end interface functionality that enable documenting, tracking and managing required and optional product filings for regulatory agencies.

FIG. 11 is an illustration of front end functionality that enables maintaining CQA-CPP relationships.

FIG. 12 is an illustration of front end functionality that enables setting, updating and documenting quality risk controls.

FIGS. 13-15 are illustrations of front end functionality that enables management of life-cycle requirements.

FIGS. 17-19 illustrate front end functionality that enables users to create and manage test cases.

FIG. 22 illustrates front end functionality that enables users to build and manage documentation.

Figure 26:
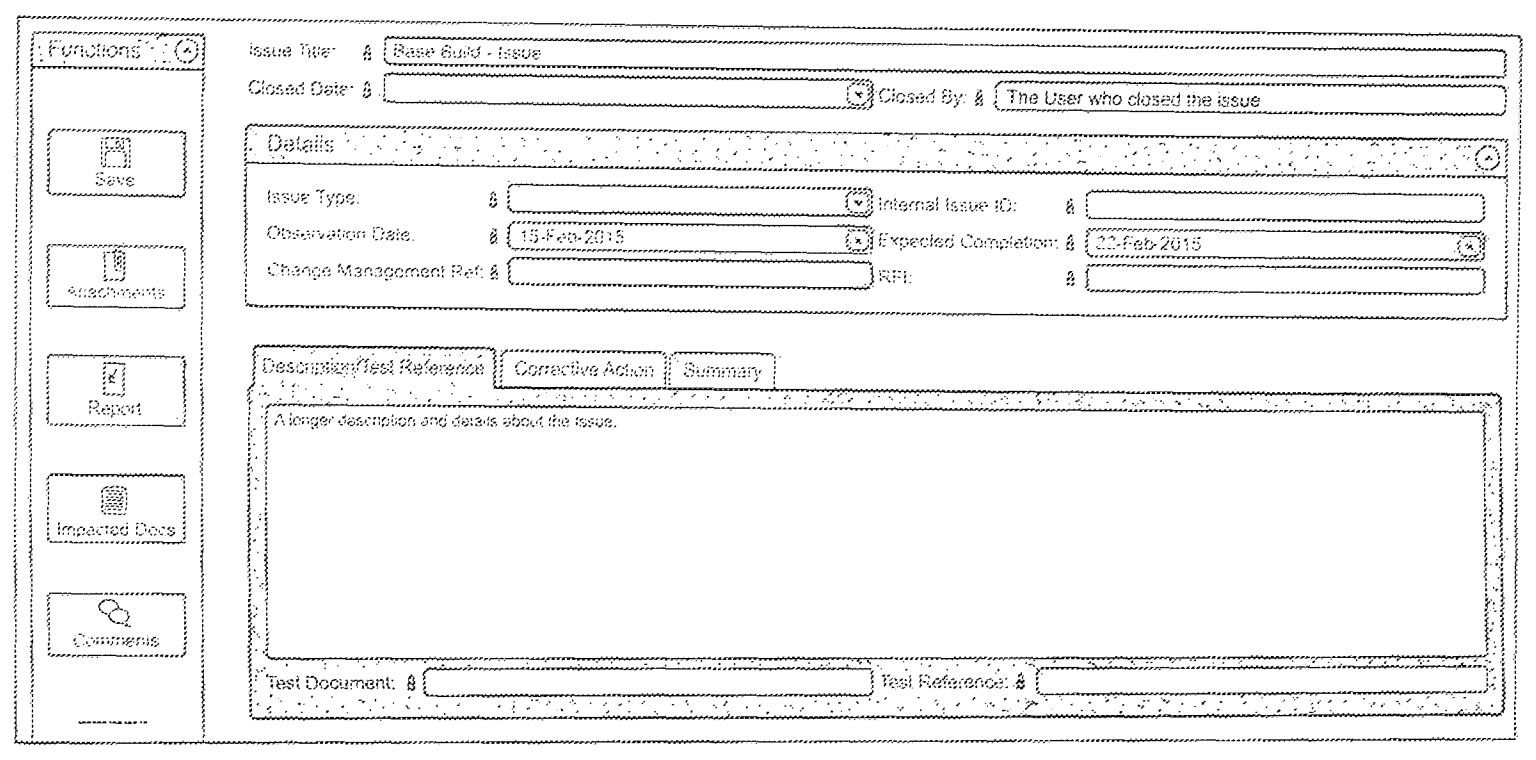
Figure 27:
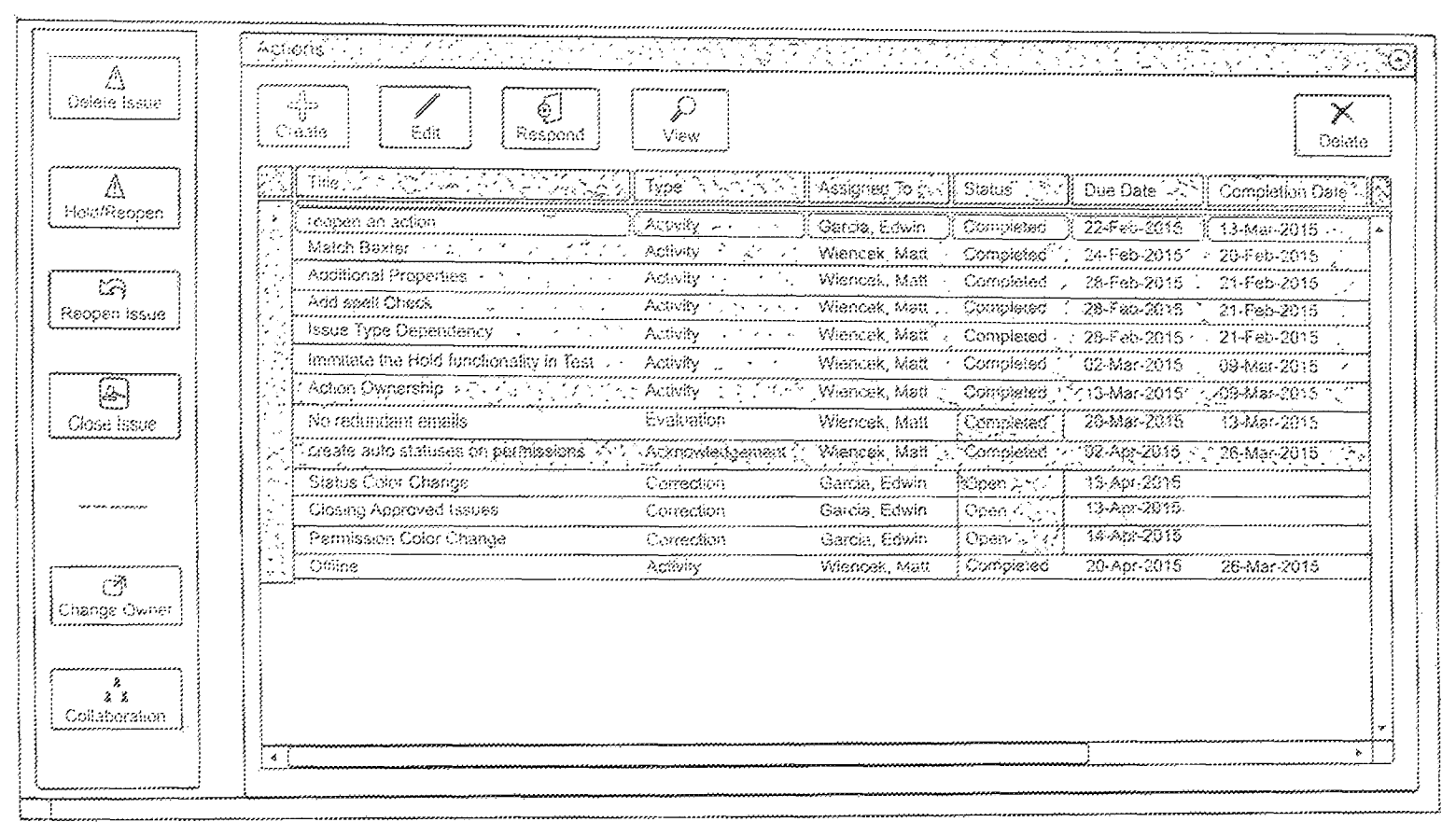
Figure 28:
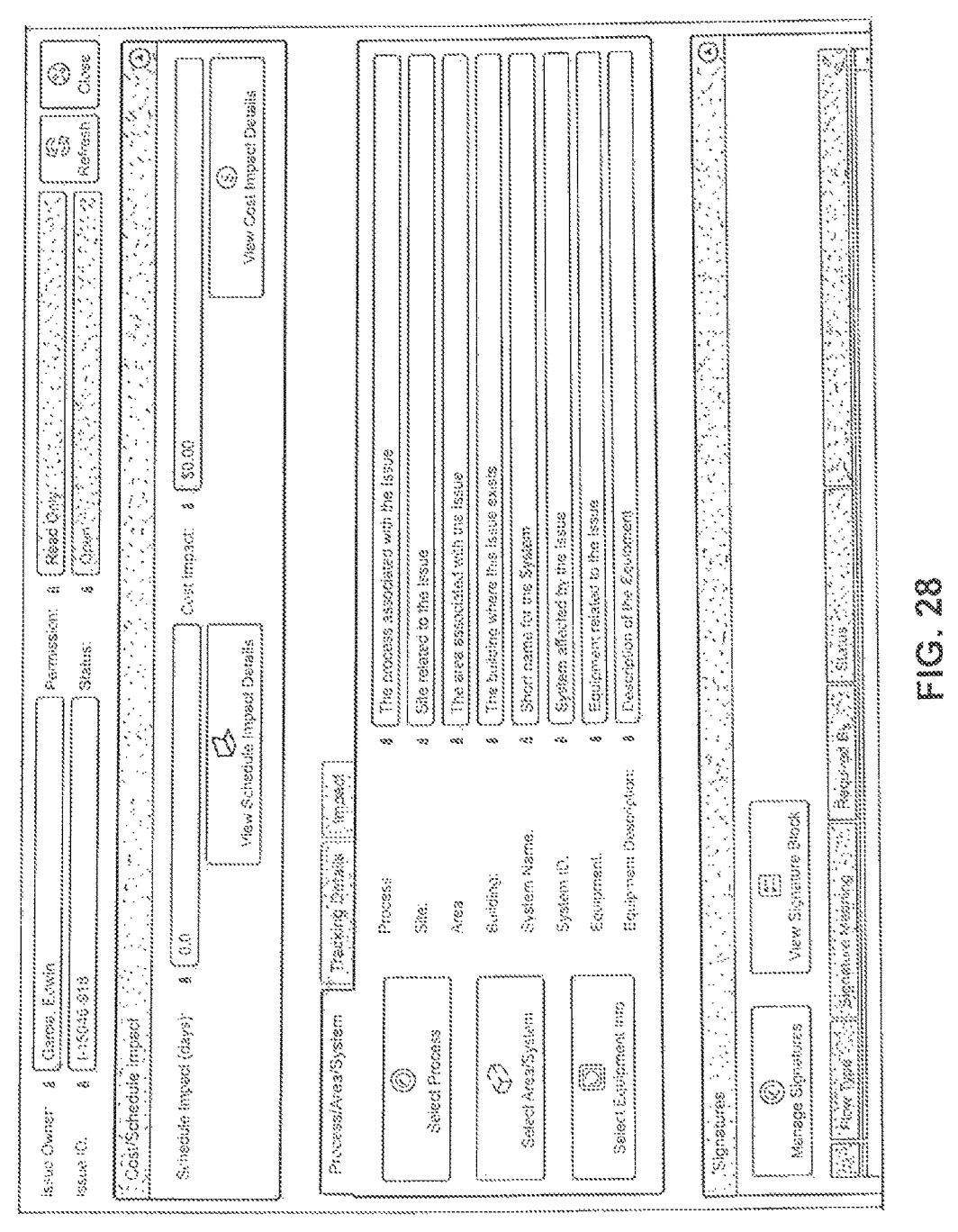
Figure 29:
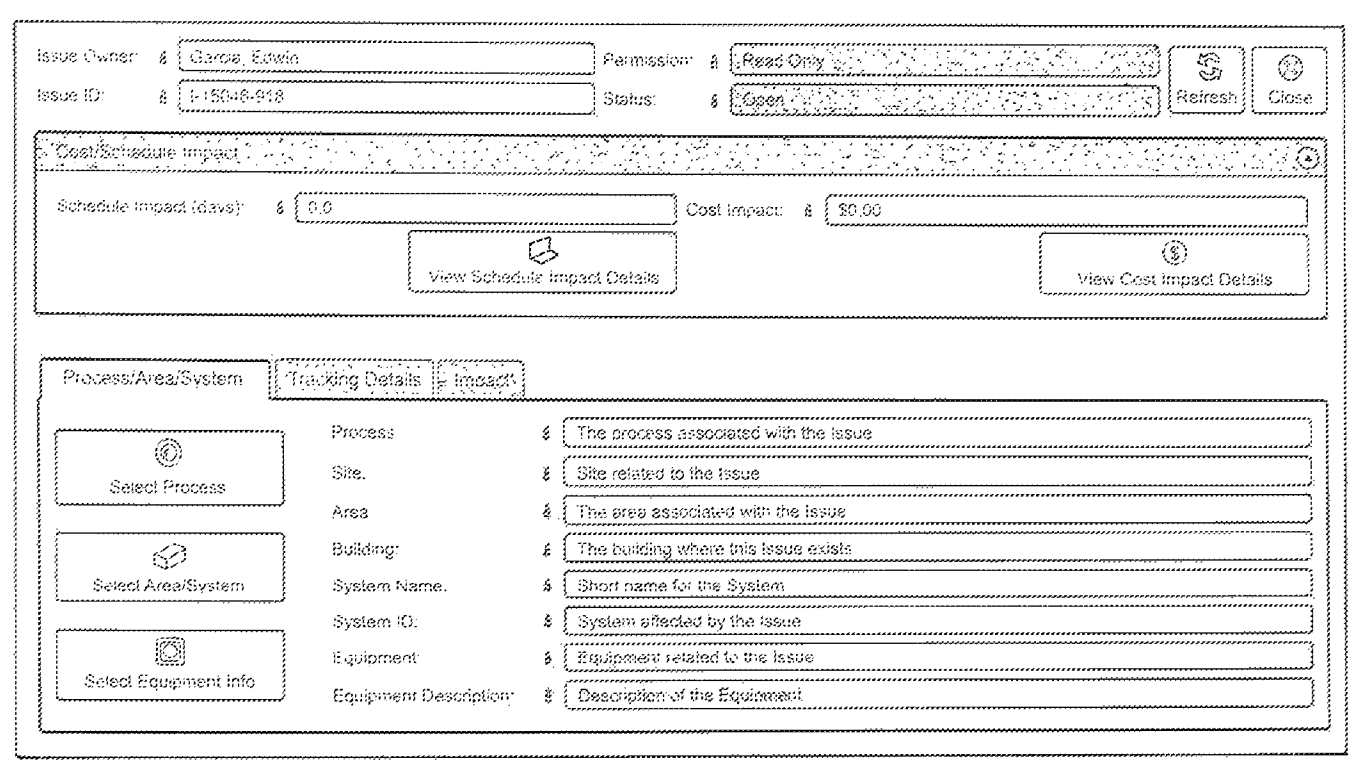

FIGS. 25-29 illustrate front end functionality that enables issue creation and management.

FIG. 30 illustrates front end functionality that enables management of meeting for user personnel.

FIG. 31 illustrates front end functionality that enables creation and editing of signature flows.

DETAILED DESCRIPTION

Disclosed embodiments may be configured to manage information, present that information in various layouts, and more importantly, link information elements to one another so as to provide meaningful connections for users when reviewing, editing or otherwise processing that information. For example, quality risks may be controlled by various methodologies, e.g., design, automation, and quality systems. These may be provided by design elements, functions, procedures, training, maintenance or calibration activities, etc. In this way, the disclosed embodiments may link many different kinds of information to allow users to easily assess, make decisions, and/or perform tasks in an efficient and effective manner. As a result, disclosed embodiments enable the ability to save money and time while improving quality.

More specifically, disclosed embodiments enable organization and linking of process knowledge, requirements definition and basis of design, quality risk assessments and risk controls, critical aspects of equipment and automation, test planning, electronic (paperless) testing, dynamic traceability matrices. Further, disclosed embodiments enable the ability to better track and resolve issues, manage documentation, record meetings, action items and decisions, track project milestones and budgets, and maintain quality standards.

Figure 1:

Thus, as illustrated in FIG. 1, there is significant utility in the management of data, knowledge, information and their interrelationships in the manufacturing environment. For example, as illustrated in FIG. 1, a full scale operation involves various data and processes for processes, people, and physical plants and infrastructure. Accordingly, construction quality control and qualification and maintenance for facilities/equipment/and automation. Additionally, there is validation required for process demonstration, measurement and continuous improvement and facilitate change management. Organizational reliability must be managed to achieve and maintain personnel knowledge, skills, training procedures, readiness and operation excellence. Further, process knowledge, quality risk management and process control strategy must be documented and analyzed.

Disclosed embodiments provide an information integration and management system that can store process control strategies in a useful way. Process control strategies are planned sets of controls, derived from an understanding of manufactured products and manufacturing processes that assure process performance and product quality (see, for example, International Conference on Harmonisation of Technical Requirements for Registration of Pharmaceuticals for Human Use (ICH) Q10). Process control strategies ensure process performance and product quality. Thus, it should be understood that each control strategy may pertain to a manufacturing process and a "product" it creates. Thus, a process control strategy is generated based on the inputs (sources) and is formulated by an enterprise that uses the information integration and management system.

Figure 2:
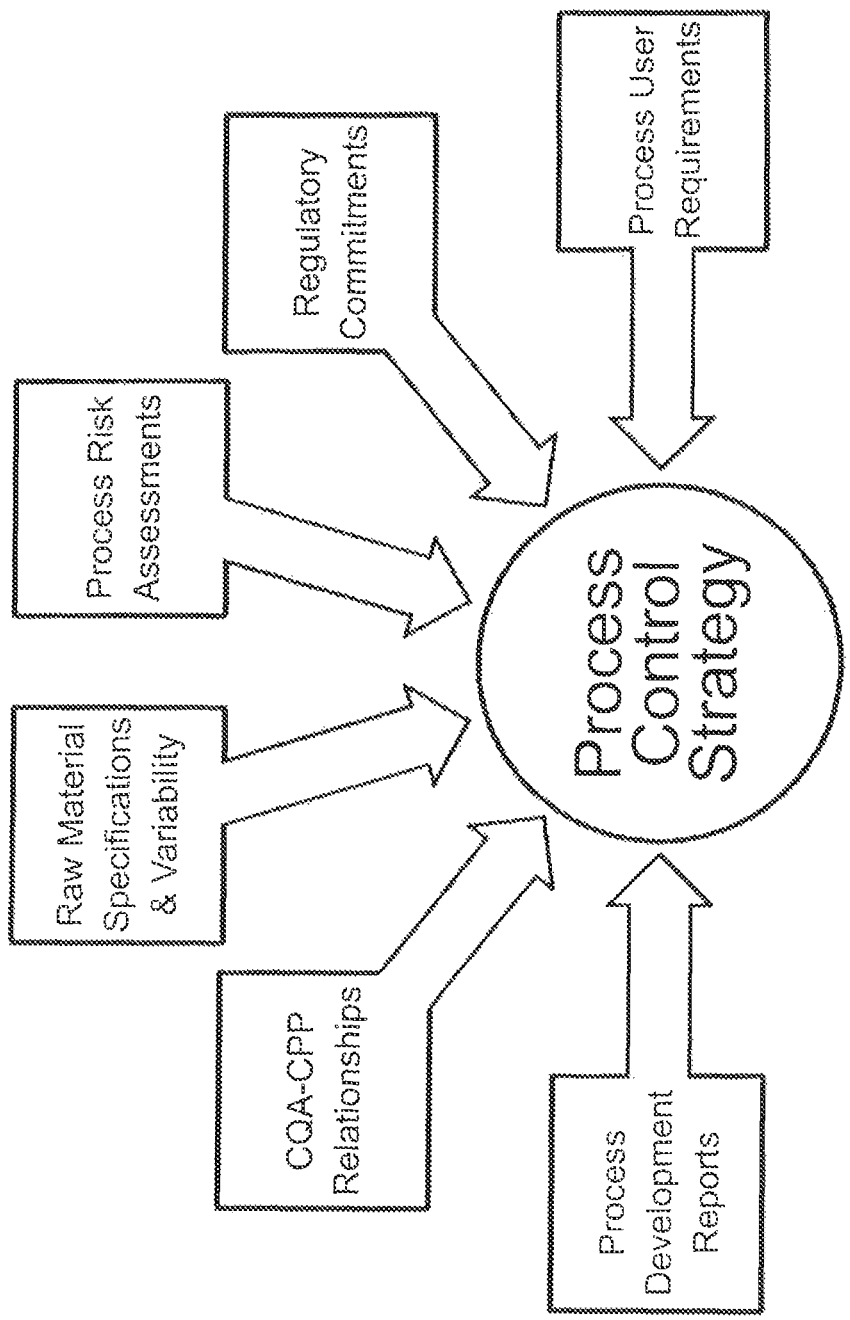
FIG. 2 illustrates a process control strategy that may be utilized in accordance with the disclosed embodiments may be generated based on process development reports, Critical Quality Attributes (CQA)-Critical Processing Parameters (CPP) relationships, raw material specifications and variability data, process risk assessments, regulatory commitments and process user requirements.

Thus, as illustrated in FIG. 2, a process control strategy may be generated based on process development reports, Critical Quality Attributes (CQA)-Critical Processing Parameters (CPP) relationships, raw material specifications and variability data, process risk assessments, regulatory commitments and process user requirements.

In one particular implementation, disclosed embodiments may provide a software and hardware implemented solution that enables manufacturing organizations to manage knowledge, manage information, comply with regulations, and operate Good Manufacturing Practice (GMP)-regulated manufacturing in a more efficient and technically innovative way.

Further, disclosed embodiments may provide an information technology solution that integrates a number of conventional processes in a novel manner necessary to specify, develop, construct, qualify, validate, and operate manufacturing facilities (e.g., drug manufacturing facilities, for example, manufacturing facilities that manufacture active drug substances or dosages or other product regulated by US Food and Drug Administration (FDA) or international GMP regulations). The scope of disclosed embodiments is designed to integrate data and manage processes within the manufacturing process, operation of the facility, and the physical plant—equipment and automation.

Figure 3:
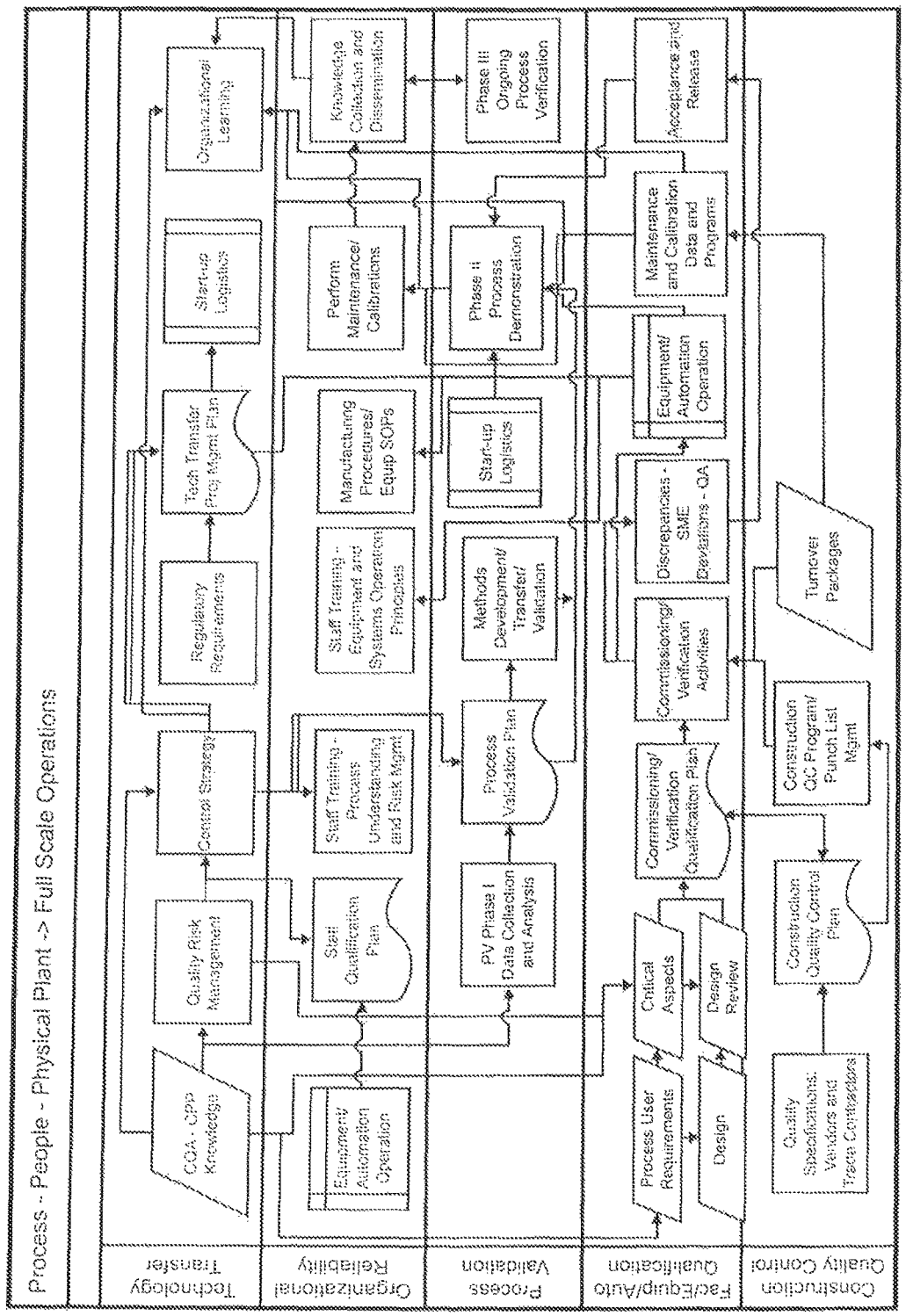
FIG. 3 illustrates an example of an example of functionality that may be included in a process control strategy.

Thus, disclosed embodiments establish relationships between aspects of technology transfer, organizational reliability, process validation, infrastructure qualification and construction quality control, as illustrated in FIG. 3. As a result, functionality, data and analytics associated with components within those aspects are interrelated in such a way that they may be better managed to provide improved workstreams and authorizations for processed involved in the manufacturing operations using process control strategies.

Figure 4:
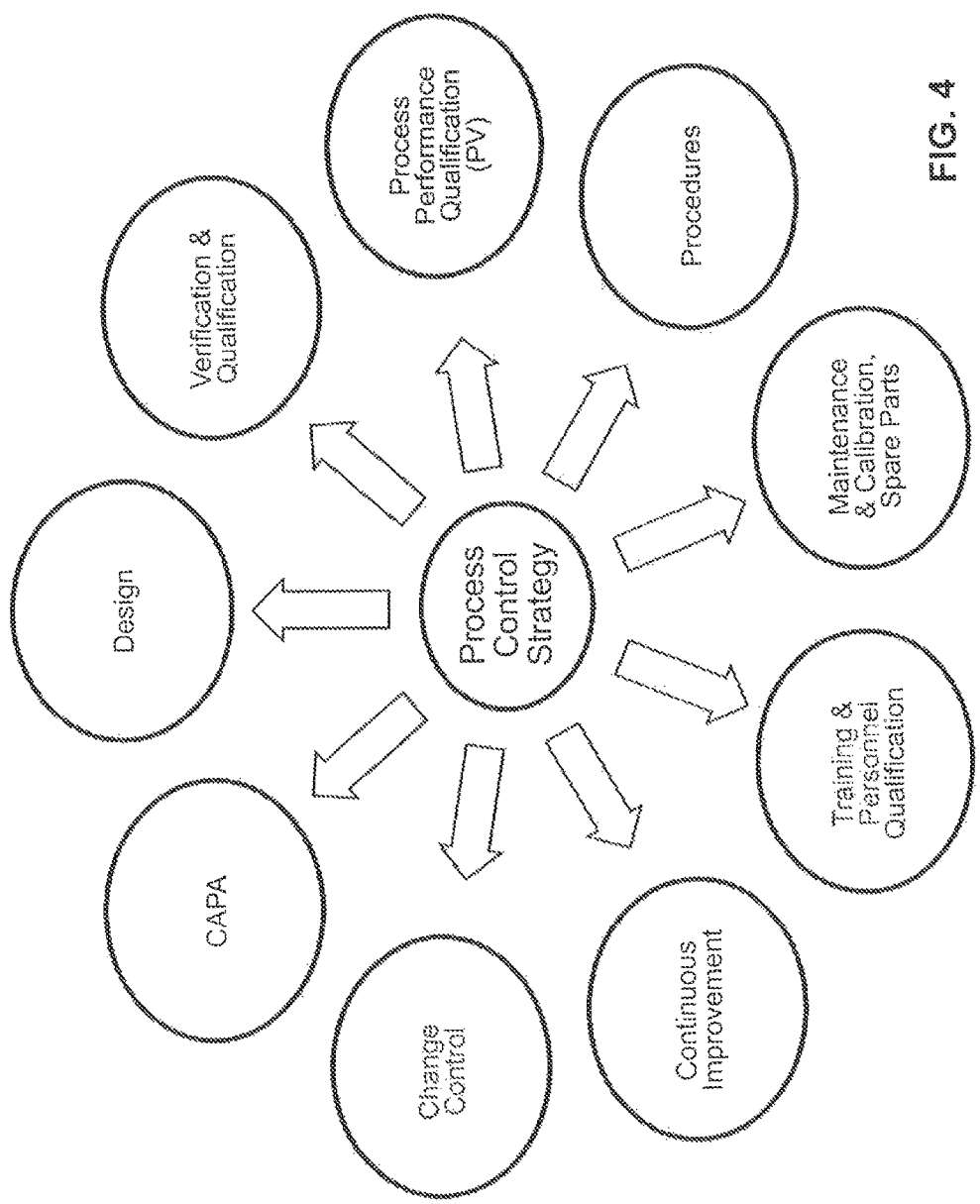
FIG. 4 illustrates further detail of the conceptual functionality of the information managed by disclosed embodiments.

Thus, as illustrated in FIG. 4, a process control strategy provided and utilized in accordance with the claimed invention may influence various aspects of the manufacturing operations for a particular enterprise. This may include design, verification and qualification, Process Performance Qualification (PV), procedures, maintenance and calibration and spare parts, training and personnel qualification, Corrective Action and Preventative Action (CAPA), change control and continuous improvement paradigms. Accordingly, a process control strategy may include all or a subset of functionality, data and analytics required for the aspects of manufacturing illustrated in FIG. 3. As a result, FIG. 4 should be understood to illustrate the conceptual functionality of the information managed by the information integration and management system but is not a structural implementation of the architecture of the disclosed embodiments.

As a result, disclosed embodiments may also be implemented to better deliver software as a service in such a manner that no IT support required. This is possible because the disclosed embodiments provide easily configurable workstreams and authorizations.

Figure 5:
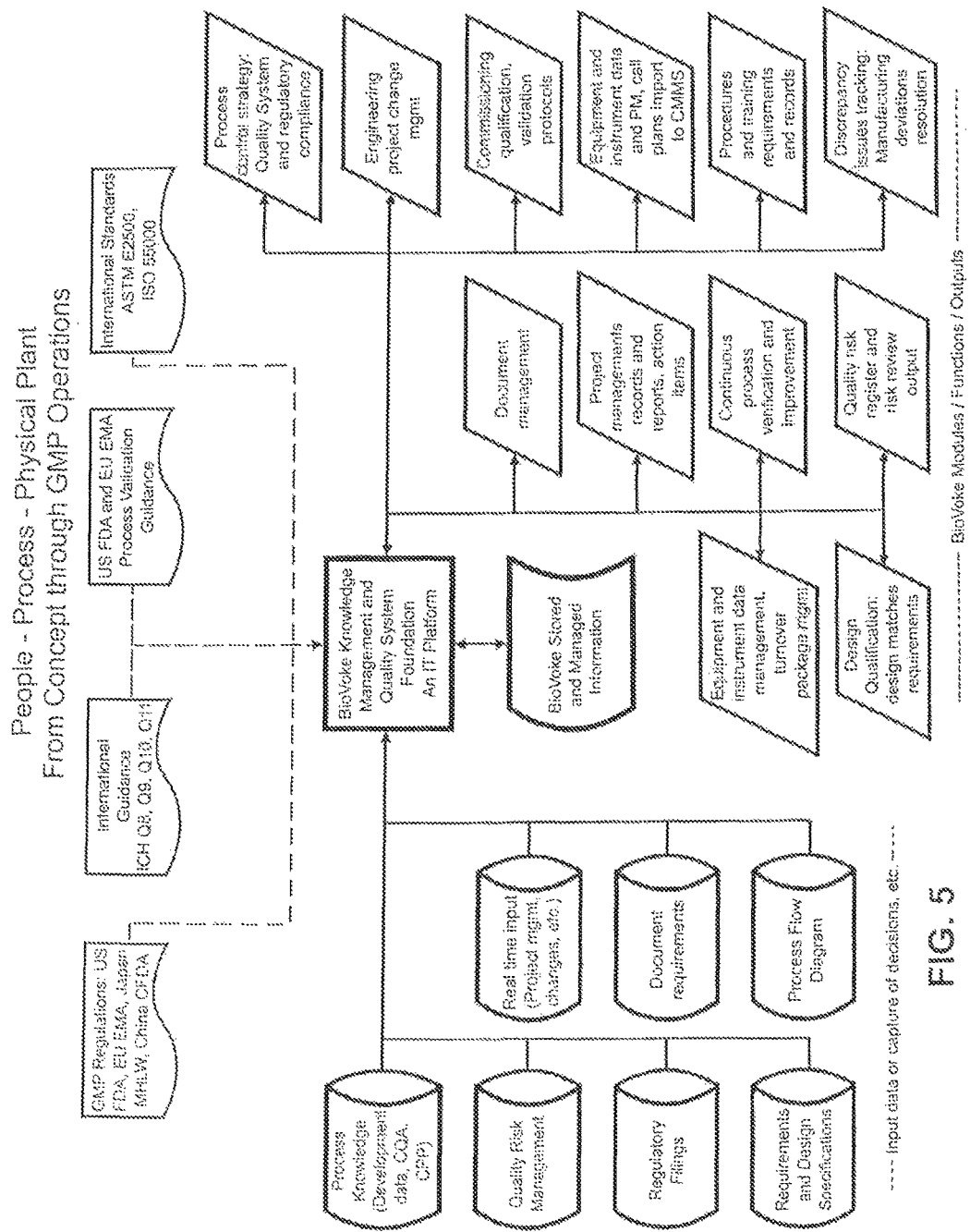
FIG. 5 illustrates the structural implementation of architecture used to provide the inventive knowledge based quality system.

FIG. 5 illustrates the structural implementation of architecture used to provide the inventive knowledge based quality system.

Information that is created and/or managed and/or cross-linked by the disclosed embodiments, and the associated work that the inventive processes facilitated include: performance of quality risk assessments, process control strategy (e.g., how each unit operation within an enterprise or supply chain serves to control CPPs or quality risks), quality system (e.g., how each element of a GMP quality system is implemented via procedures, training, equipment, processing, automation etc.), regulatory compliance (e.g., how each element of GMP regulations is addressed in the manufacturing quality system), engineering or project change management and regulatory QA change control, and development of verification documentation for factory or site acceptance testing, commissioning, formal qualification, and process validation.

As illustrated in FIG. 5, the central knowledge management and quality system foundation component and stored and managed information component serve to connect the input data or capture of decisions, etc. with system modules/functions/outputs used to support a front end for the system. In this way, a front end, Graphical User Interface (GUI) may be provided to enable users to interact with the system and the information that is integrated and managed by that system. As further indicated in FIG. 5, the knowledge management and quality system foundation component may be compatible with various regulatory requirements including GMP regulations, International Guidance, US FDA and EU EMA Guidance and other International Standards.

Figure 6:
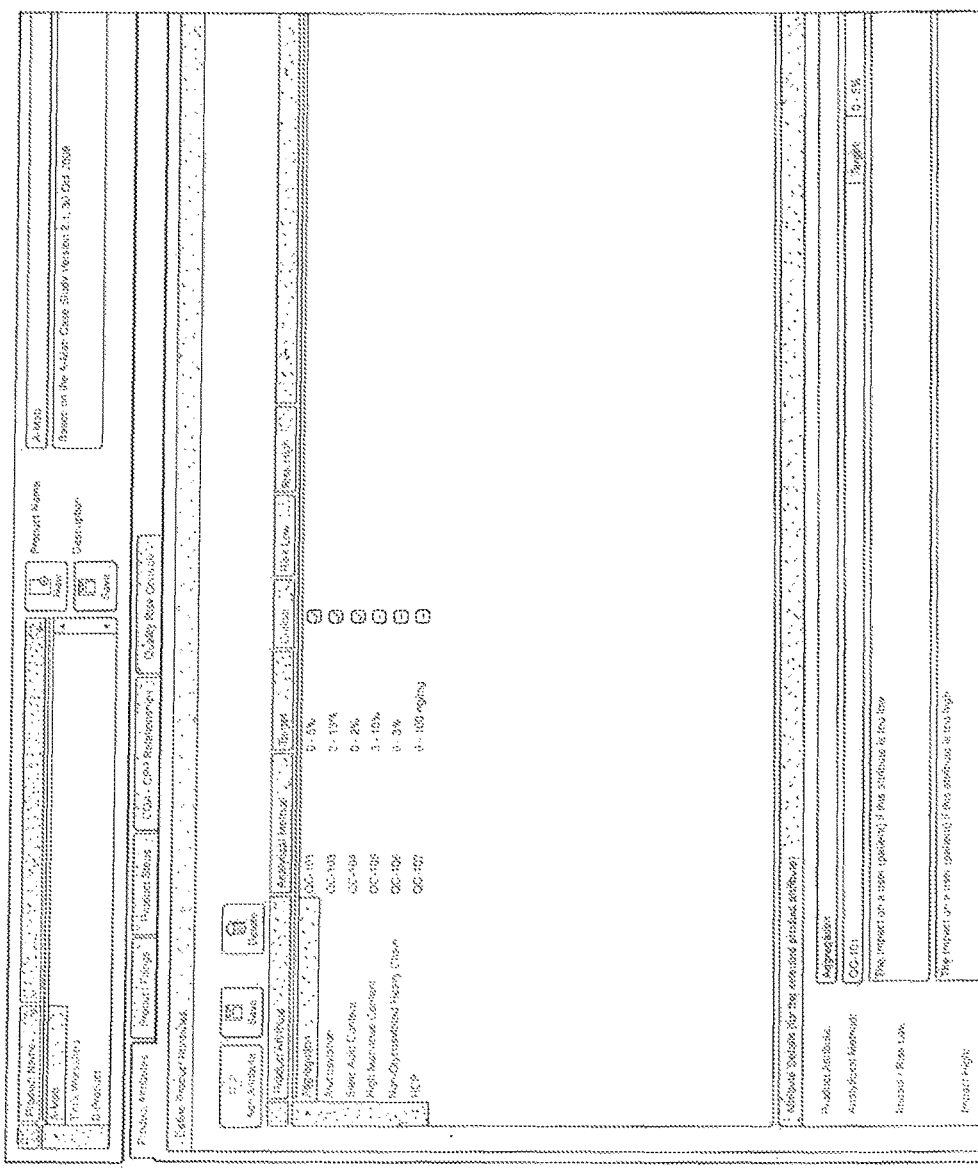
FIG. 6 is a screen shot of a front end interface of the system that enables process and product control to users to enable management of product details and attributes, view and edit attribute specific and quickly view targets and risk.

FIG. 6 is a screen shot of a front end interface of the system that enables process and product control to users to enable management of product details and attributes, view and edit attribute specific and quickly view targets and risk.

Figure 7:
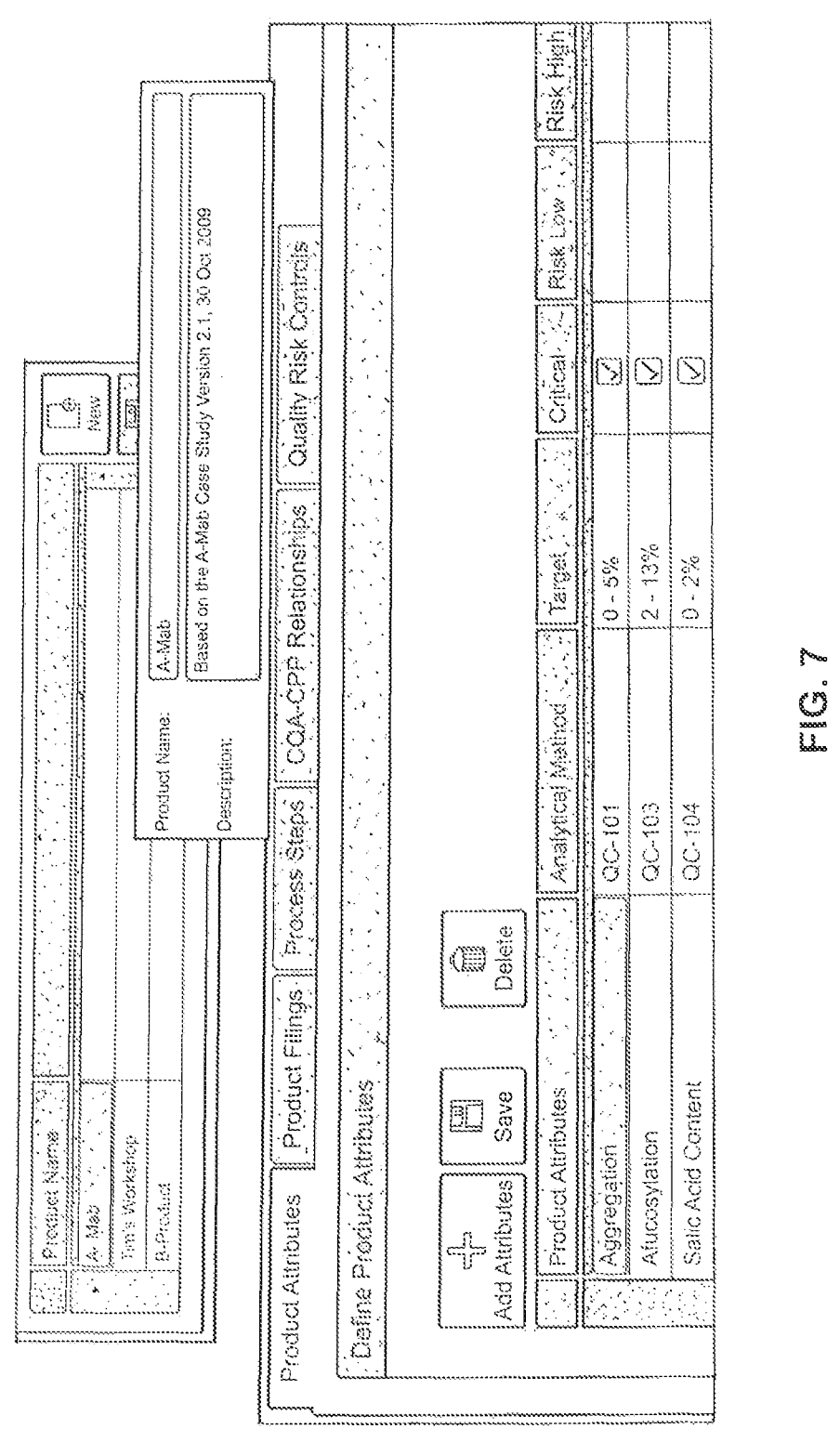

FIG. 7 is an illustration of front end interface details that enable the linking of attributes to quality processes and to products. Additionally, targets and risk value may likewise be assigned to various attributes.

FIG. 8 is an illustration of front end interface functionality that enables the ability to manage attributes and product details including impact on the patient. Targets and risk values may be assigned to attributes. Analytical methods can be tied to attributes. Following product launch, pharmacovigilance protocols require that patient outcomes be monitored and additional clinical data be compiled. The illustrated functionality allows the results of these further studies to be captured and the enhanced product knowledge be translated into potential manufacturing process improvements. This is done through the database relationships of quality attributes to manufacturing process parameters (CQA to CPP), the relationships of manufacturing process parameters to the manufacturing process control strategy, and the relationships of this strategy to elements of the manufacturing operation: the equipment, automation, procedures, personnel training, and other elements.

Disclosed embodiments utilize electronic protocols. Thus, electronic protocol outlines may be pre-approved allowing individual test cases to be approved as they are developed, reducing overall review time. Protocols may be routed automatically and electronically; as a result, there are no paper documents to get lost. Test cases can be populated from a pre-approved test case library, reducing development time. As a result users can see a 50%-90% reduction in protocol development time.

Moreover, since protocols are electronically completed, Good Distribution Practice (GDP) issues are easily resolved. GDP deals with the guidelines for the proper distribution of medicinal products for human use. Further, protocols are not lost or damaged during execution.

Moreover, as explained herein, issues/deviations for protocols may be documented electronically, speeding their review and resolution and individual test cases can be reviewed as they are completed, reducing post-execution review time. As a result, users may see a 35%-90% reduction in protocol execution time.

Disclosed embodiments provide a knowledge based quality system that is designed to meet ICH Q8-9-10-11-12, ICH Q8, Q11 (Process control strategy), ICH Q9 (Quality risk management), ICH Q10 (Quality system), ICH Q11 (Product life-cycle management).

Disclosed embodiments also provide an effective mechanism for both knowledge management and process knowledge, wherein relationships between Critical Quality Attributes (CQA)-Critical Processing Parameters (CPP), design, verification, validation, quality system are built, maintained and managed.

Thus, it should be understood that disclosed embodiments provide an example and implementation of Process Analytical Technology (PAT), which has been defined by the United States FDA as a mechanism to design, analyze, and control pharmaceutical manufacturing processes through the measurement of CPP, which affect Critical Quality Attributes.

Figure 11:
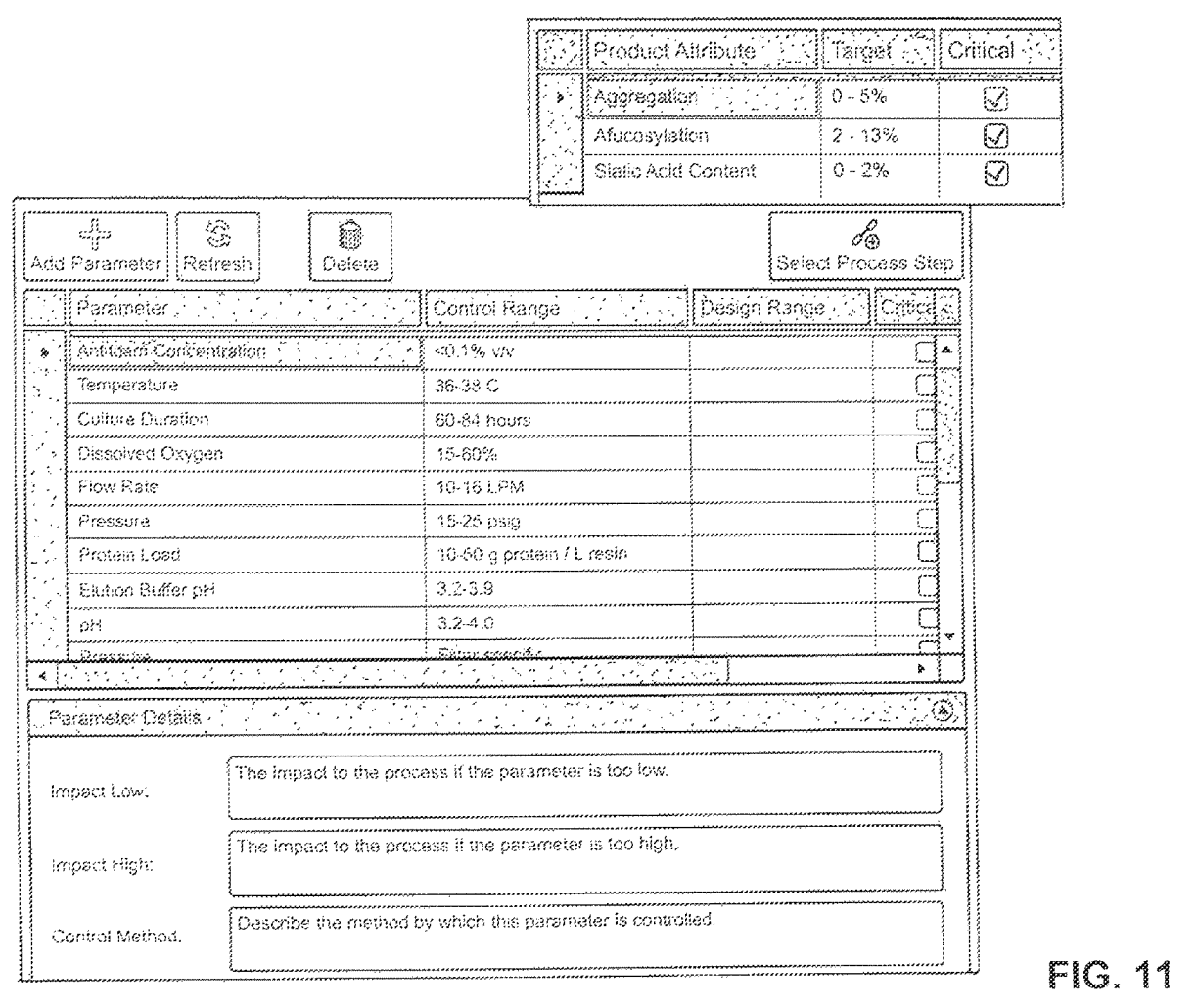

Accordingly, disclosed embodiments provide mechanisms for better defining, understanding, managing and documenting processes by defining their CPPs, so as to enable monitoring them in a timely manner (optionally in-line or on-line). Thus, when disclosed embodiments are implemented in the pharmaceutical manufacturing regulatory environment, the result is more efficient testing with a parallel reduction of over-processing, enhancing consistency and minimizing rejects. FIG. 11 is an illustration of front end functionality that enables maintaining CQA-CPP relationships. Through the fields and screens of the front end, users can specify critical processes as necessary, set parameter control and design range and specify high and low impact details. As mentioned above, it should be understood that disclosed embodiments may be configured to provide these capabilities to manufacturing enterprises that are subject to the United States FDA and/or similar international GMP regulations. In such implementations, it should be understood that disclosed embodiments may be configured to facilitate these enterprises' compliance with various regulations and standards including but not limited to: US FDA 21 CFR Parts 210 and 211 (GMP Regulations), and similar EU EMA, Japan MHLW, China CFDA, WHO, and other national GMP regulations; US FDA and/or similar international regulations for the manufacture of combination products, biologics, and medical devices; US FDA Guidance on Process Validation (2011) and similar EU EMA Process Validation Guidance; International Conference on Harmonization Quality Guidance Documents (ICH Q7A, ICH Q8-R2, ICH Q9, ICH Q10, ICH Q11; International standards including ASTM E2500 and ISO 55000. Further disclosed embodiments help ensure compliance with the requirements of 21 CFR Part 11.

Further, disclosed embodiments may be configured to manage information for such manufacturing enterprises from outside sources including product and process development data. Management of such data enables generation, management and understanding of information regarding product quality attributes that provide efficacy; further, such data enables understanding when product quality attributes not within specifications could pose a hazard to product end users (e.g., CQAs); relationships between CQAs and process conditions—raw materials, and in-process parameters necessary to effect CQAs (e.g., CPPs).

Such third party generated data may also include results of quality risk assessments, and regulatory filings, in particular the information found in the Chemistry Manufacturing Controls section of drug filings (also known as an international Common Technical Document.

Further, such data can include process user requirements, functional requirements and design specifications, either in the form of data entry records or as separate documents which may then be managed as document records by the inventive information technology management system. Moreover, disclosed embodiments facilitate design qualification, which involves confirming that a design matches requirements.

Figure 12:
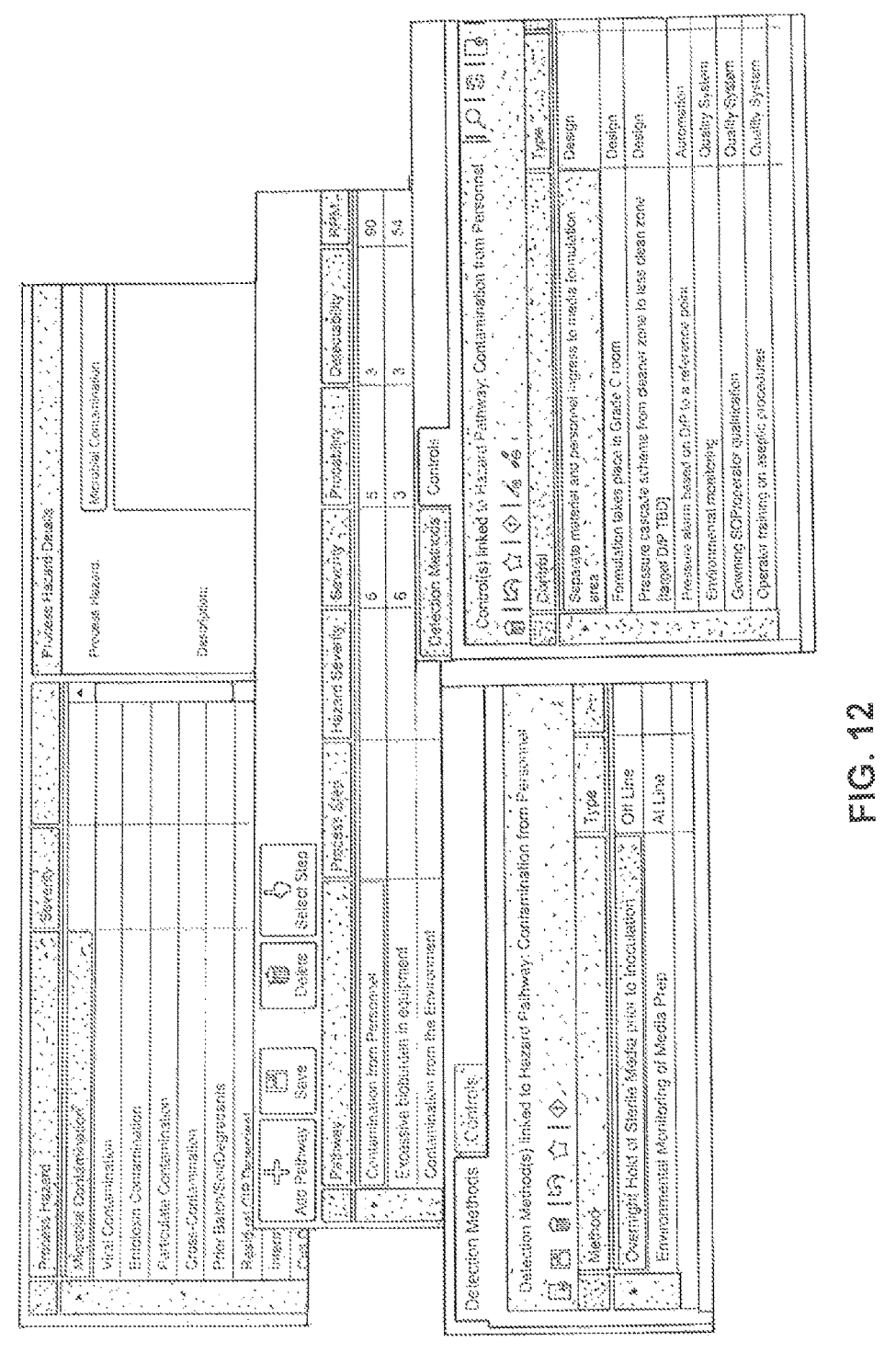

FIG. 12 is an illustration of front end functionality that enables setting, updating and documenting quality risk controls, for example, tracking process hazards and severity, maintaining pathway information for process steps and storing detection methods and controls.

Figure 13:
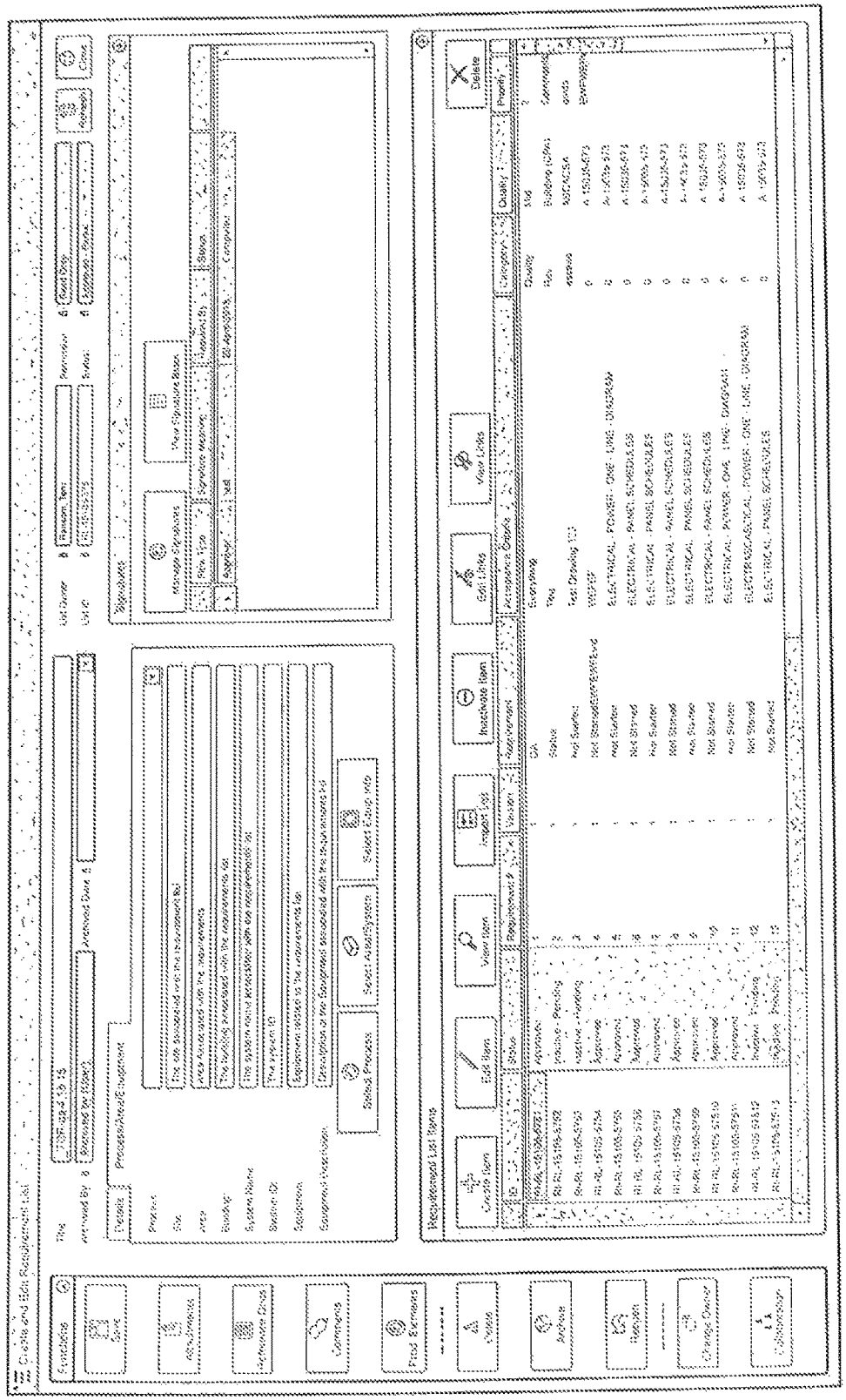
Figure 14:
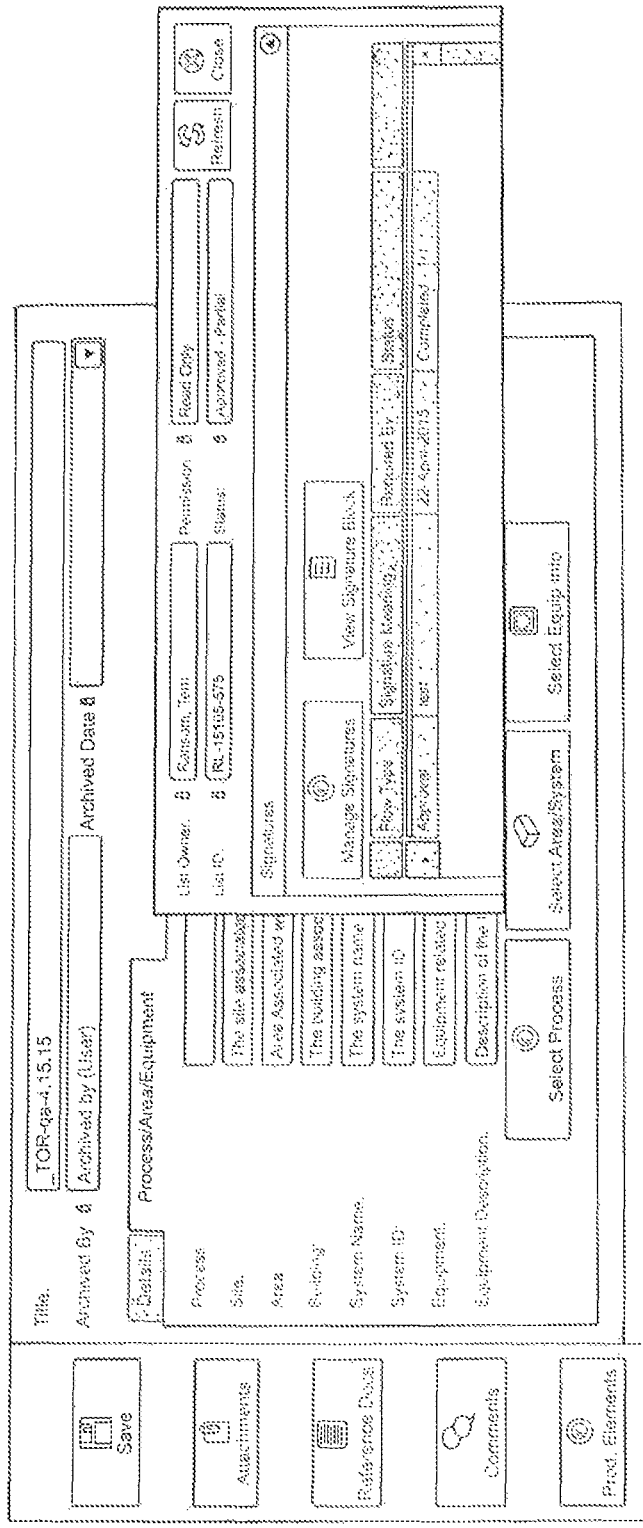
Figure 15:
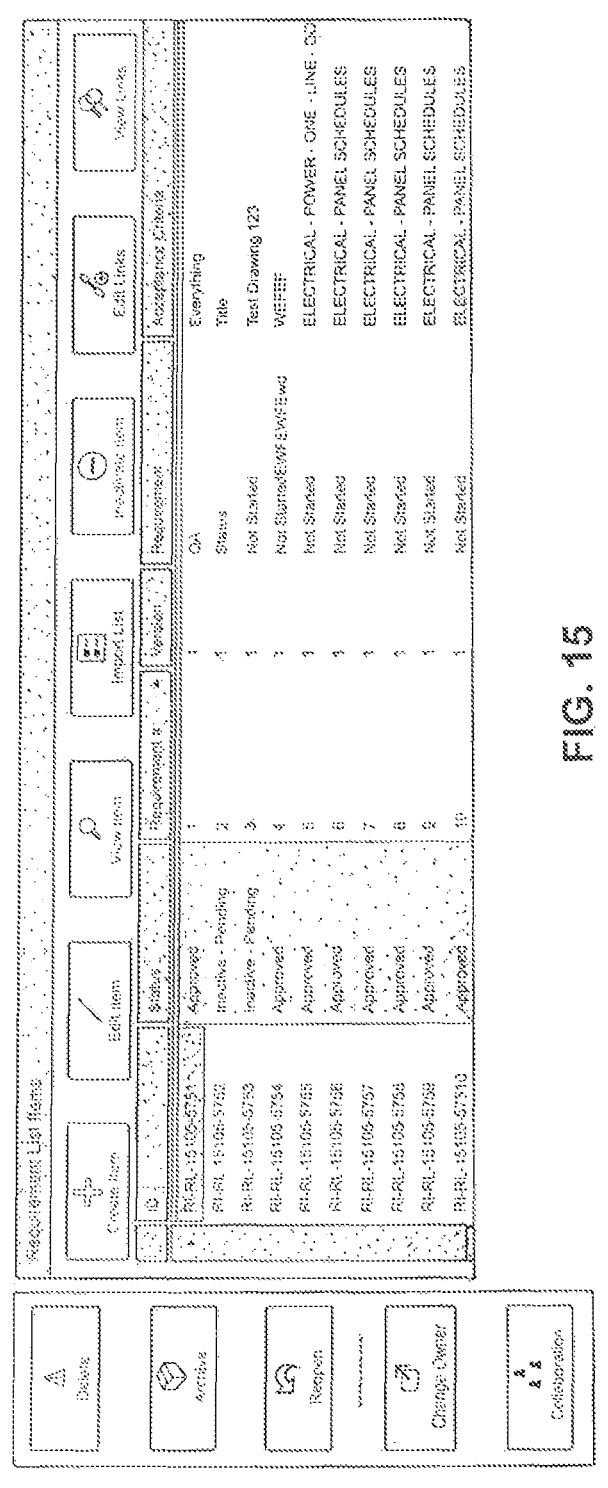

FIGS. 13-15 are illustrations of front end functionality that enables management of life-cycle requirements.

For example, the functionality enables users to draft, review, approve, archive and revise requirements as well as automatically update traceability matrices upon approved changes. Users may also supersede, inactivate or archive requirements if necessary, import existing requirements from spreadsheets, create and approve links from requirements to components, use requirements to drive electronic testing, and directly attach reference documentation for requirements. As a result, the disclosed embodiments enable multilayer security, allow for multiple levels of collaboration, track comments, enable a full audit trail and enable creation of custom approval flows.

Figure 9:
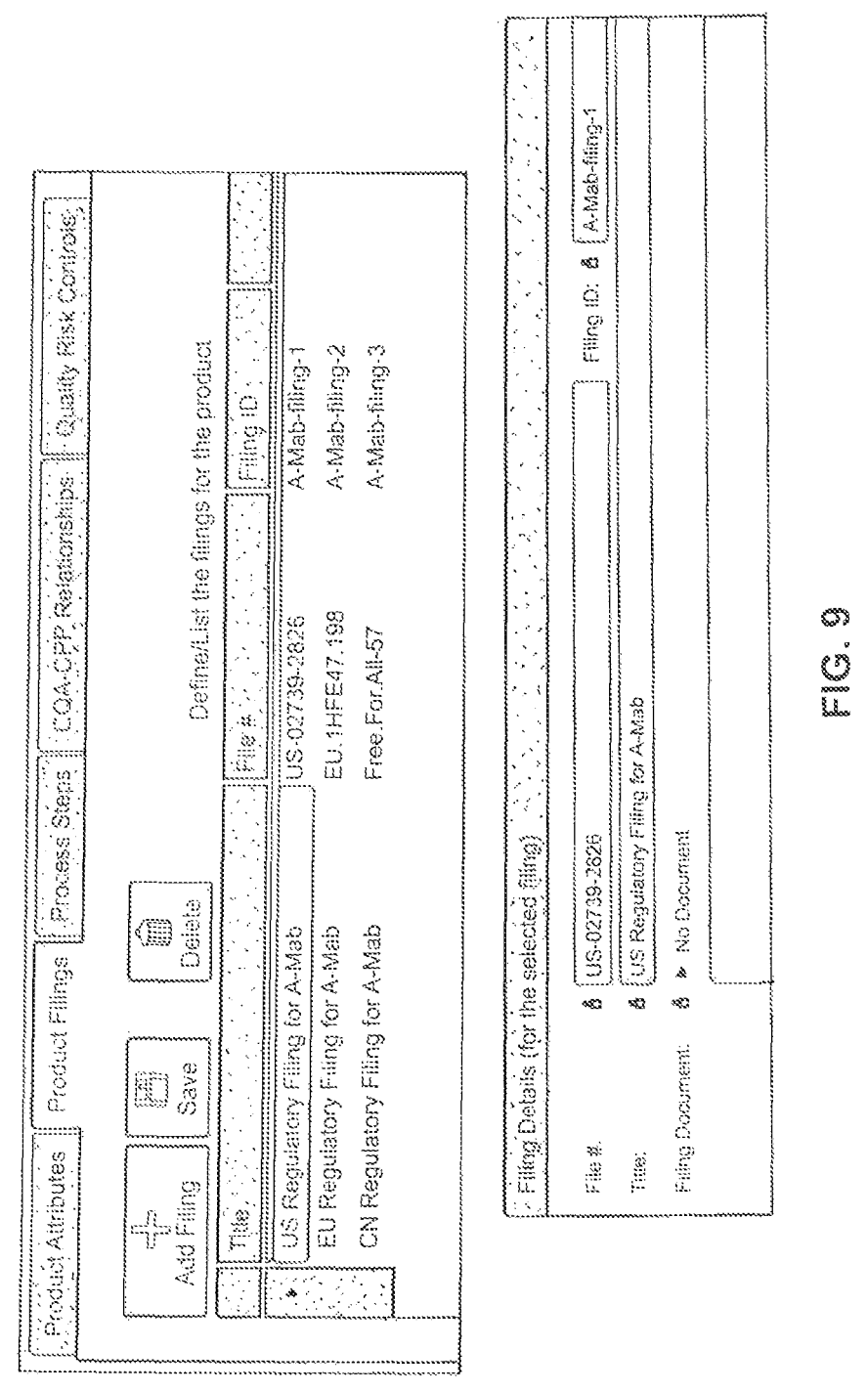

Disclosed embodiments enable improved creation, editing and management of documents. FIG. 9 is an illustration of frond end interface functionality that enable documenting, tracking and managing required and optional product filings for regulatory agencies. For example, product filings may be tracked by number, ID, and title. Additionally, the system enables attachment of product filing documents and inclusion of comments for future reference.

Figure 10:
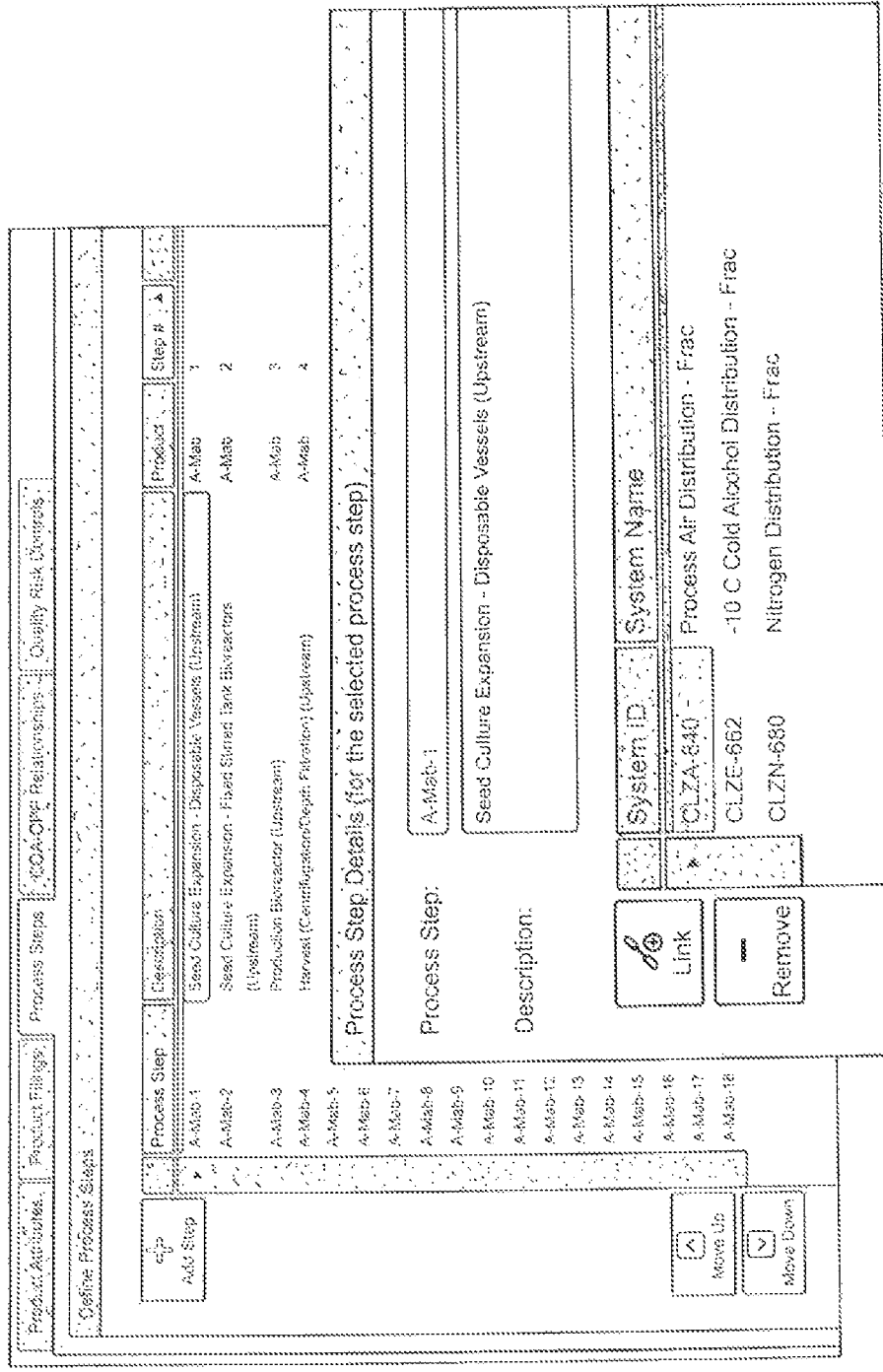
FIG. 10 is an illustration of front end functionality that enables management of process steps.

FIG. 10 is an illustration of one front end functionality that enables management of process steps including, for example, maintaining process steps and order and linking process steps to necessary systems.

Figure 16:
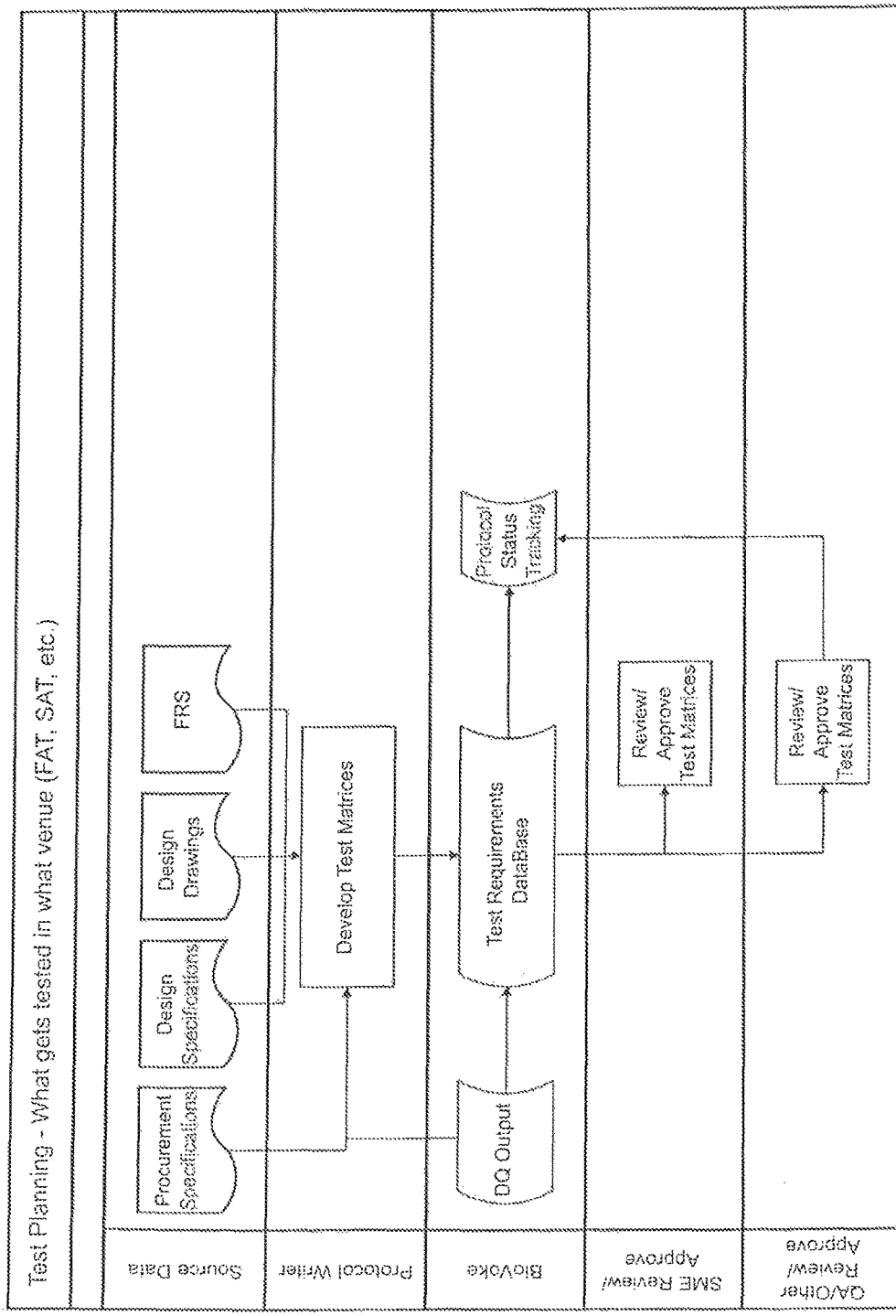
FIG. 16 illustrates exemplary architecture included in the system that enable test planning.
Figure 17:
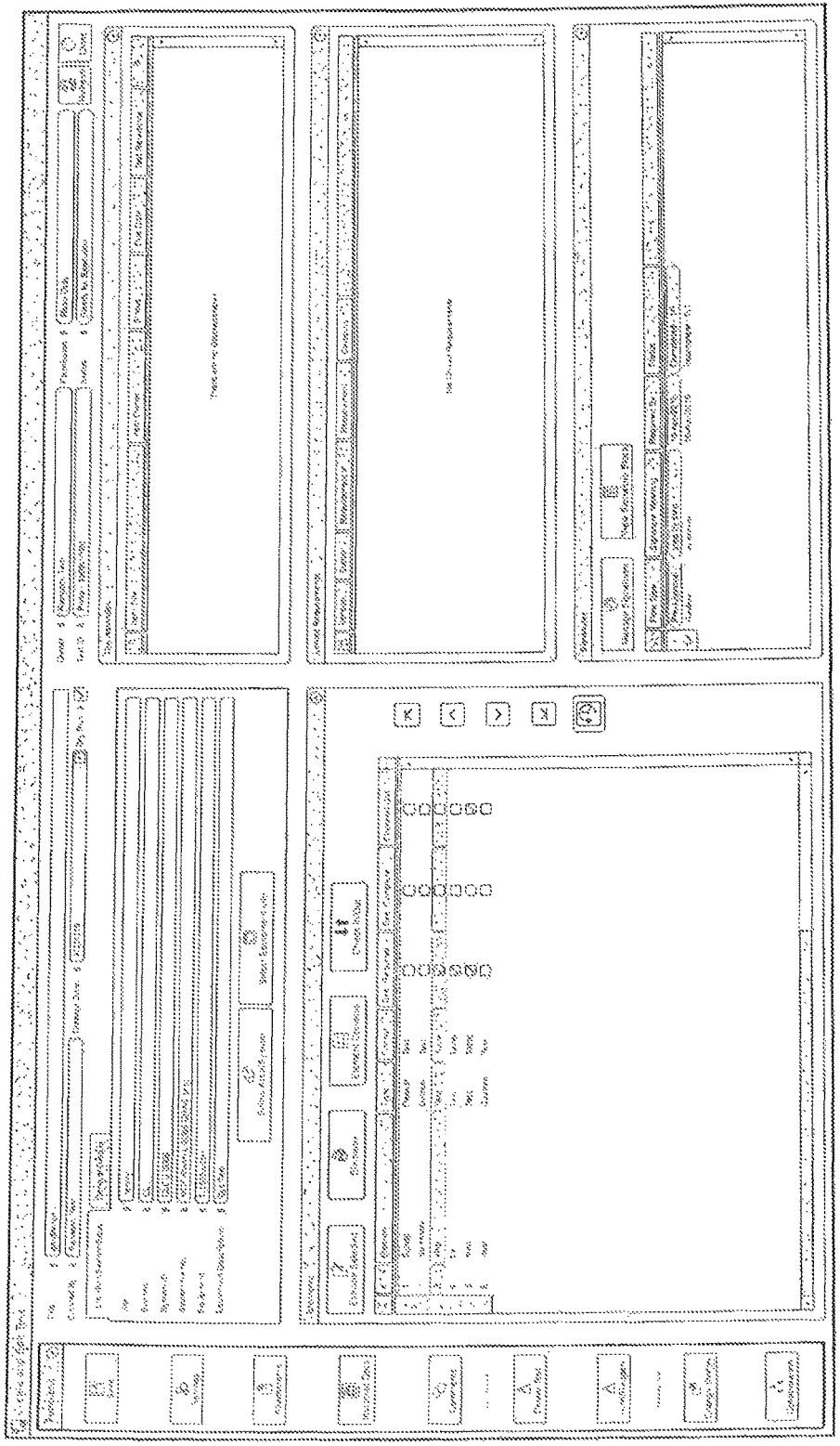

Disclosed embodiments enable improved development and executions of tests, e.g., test scripts in a paperless format. FIG. 16 illustrates exemplary architecture included in the system that enable test planning that provides 100% paperless electronic execution, online/offline support, and table support.

The architecture enables users to design their own test cases, link test cases to regulatory and other requirements, create acceptance criteria automatically, check in and check out test cases, auto-generate discrepancies, enforce real-time verifications, auto-track discrepancy status and can create dry runs. As a result, the test case functionality of the disclosed embodiments enable multilayer security, allow for multiple levels of collaboration, track comments, enable a full audit trail and enable creation of custom approval flows.

Figure 18:
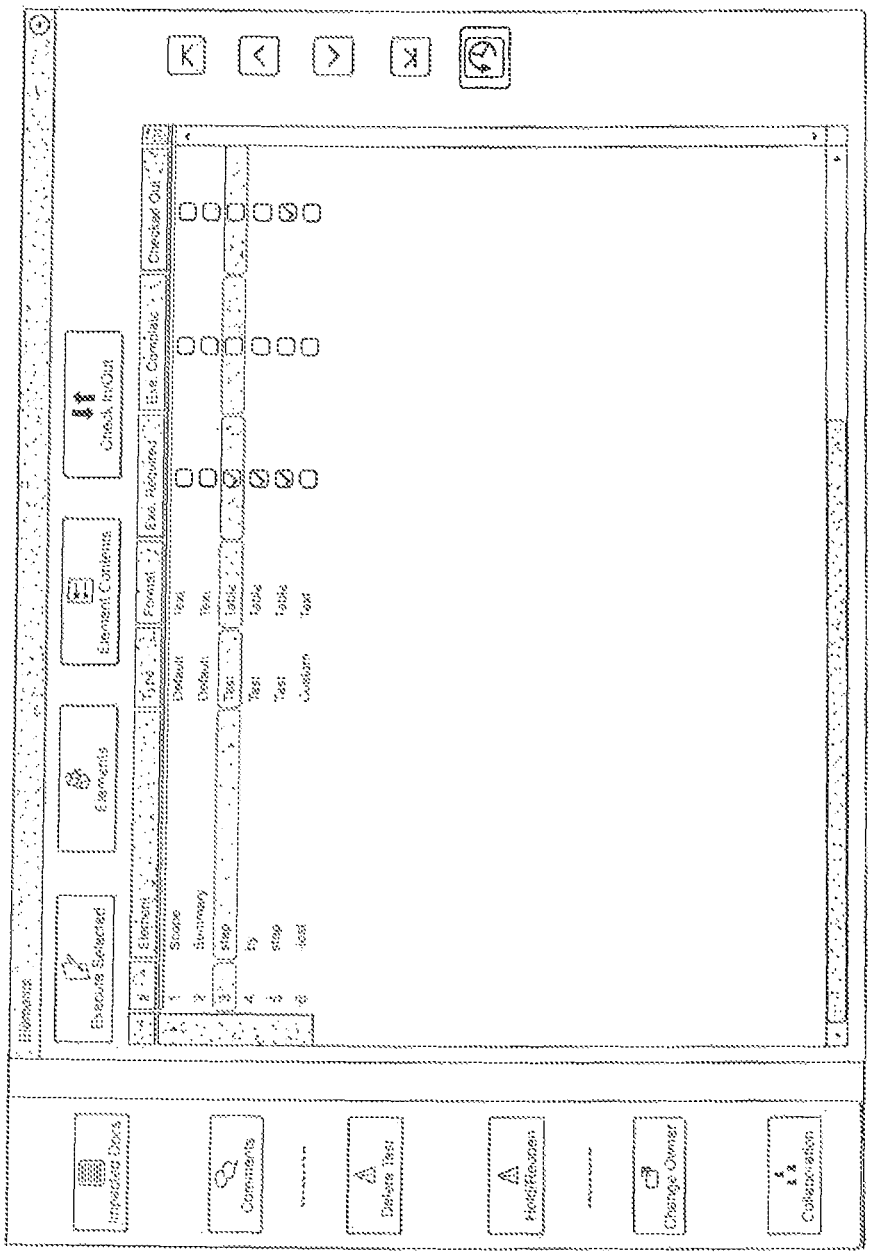

FIG. 18 illustrates front end functionality that enables users to create and manage test cases. For example, as illustrated in FIG. 18, users can track elements for test execution, check in/check out test cases, add comments, modify test elements and order, review the linked underlying process requirements, review and approve testing in a structured and controlled manner to meet regulatory compliance requirements, execute individual elements on demand, and create dry runs.

Disclosed embodiments provide a repository of operational experience data from all sources, of all types, that can be viewed and analyzed for trends; gaps in quality system, gaps in training, gaps in procedures, process improvement opportunities, refinement of design space, changes to control strategy, adjustments to maintenance and calibration programs, etc.

Figure 19:
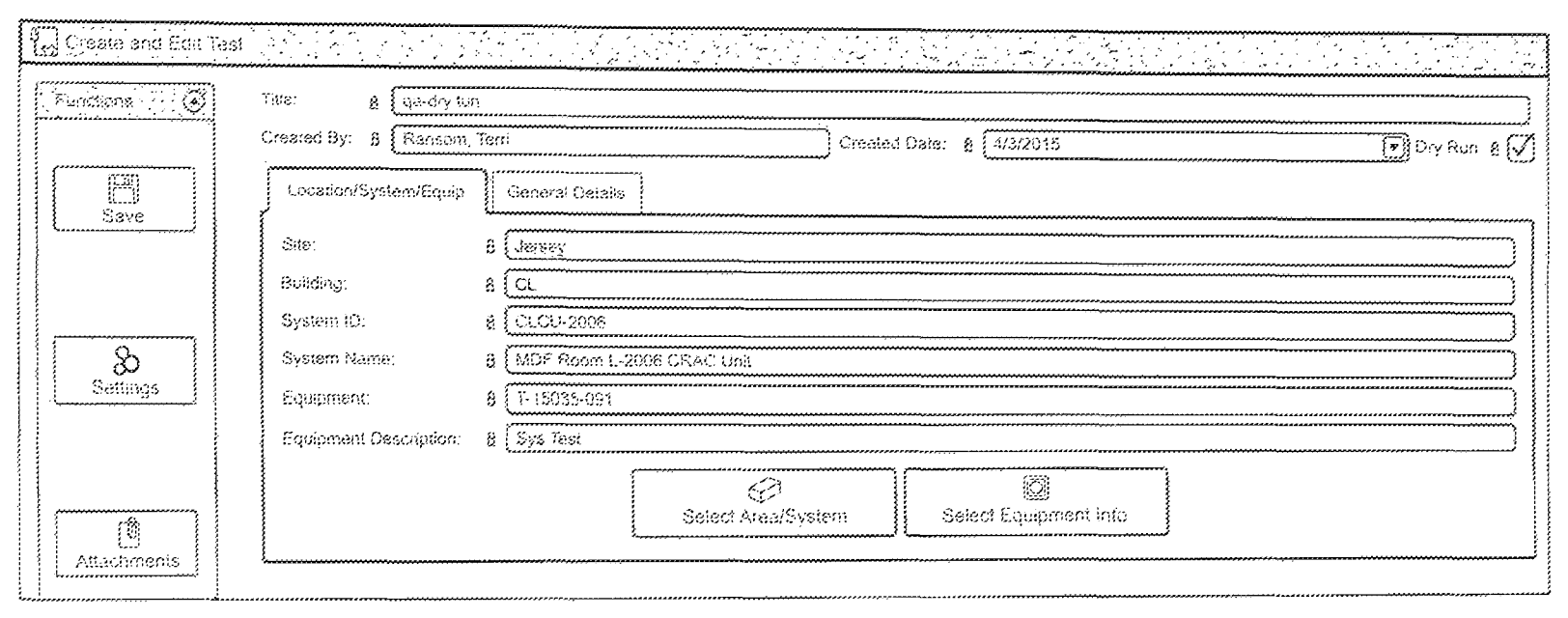

Likewise, as illustrated in FIG. 19, users can create test case libraries to use as templates to instantly recall them on future electronic protocols. A Test library is a repository of tests, which a user can fill, to later recall and use as templates for any other test after that. Optionally, the user can replicate test cases from the library pick from a list of any other test in existence. Thus, users can copy test cases from other electronic protocols, assign tests by client sites, building, system, equipment, etc., assign test system and equipment from existing database entries and add attachments for test cases.

Figure 20:
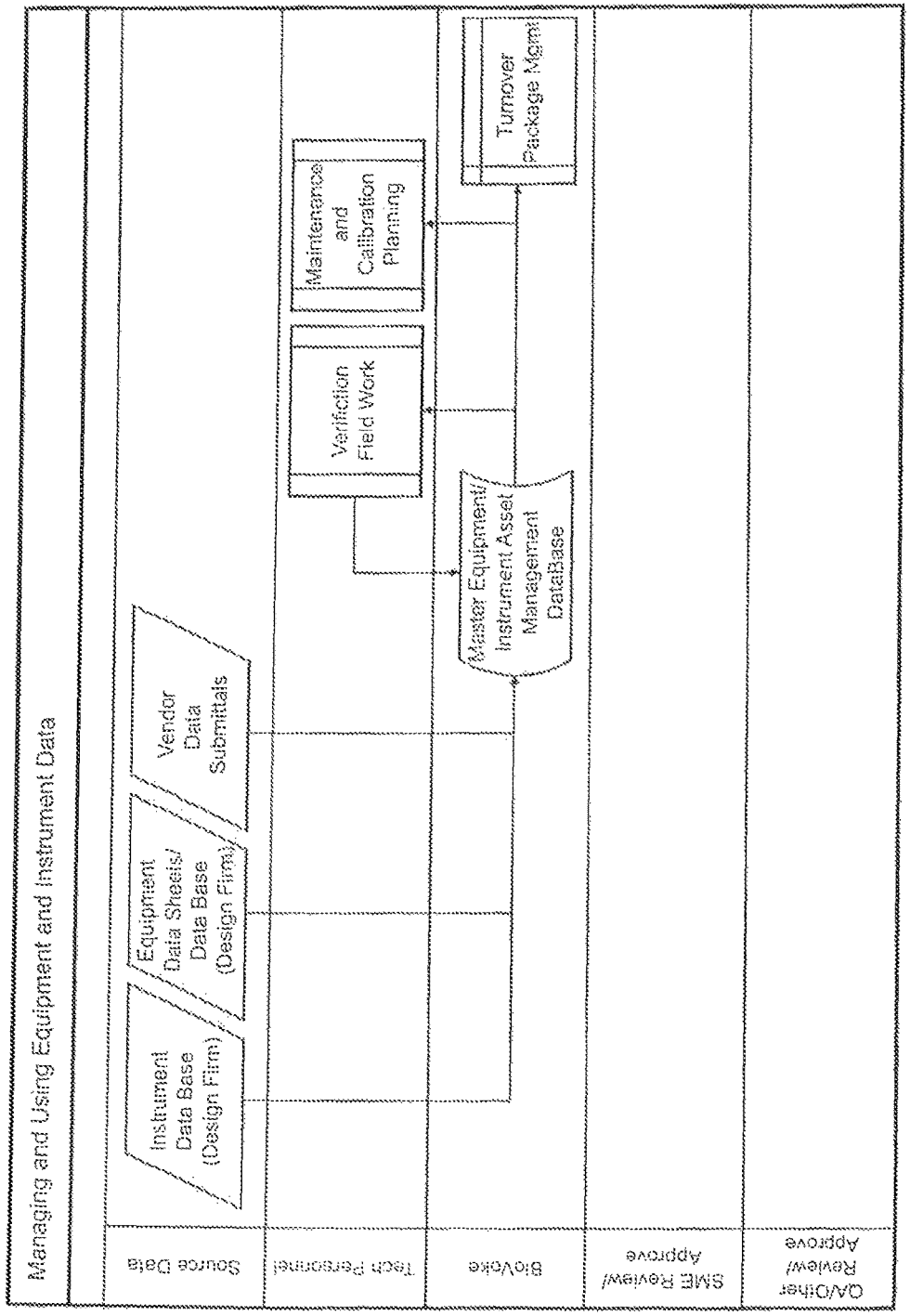
FIG. 20 illustrates exemplary architecture included in the system that enable equipment and instrument data management.

FIG. 20 illustrates exemplary architecture included in the system that enable equipment and instrument data management.

Figure 21:
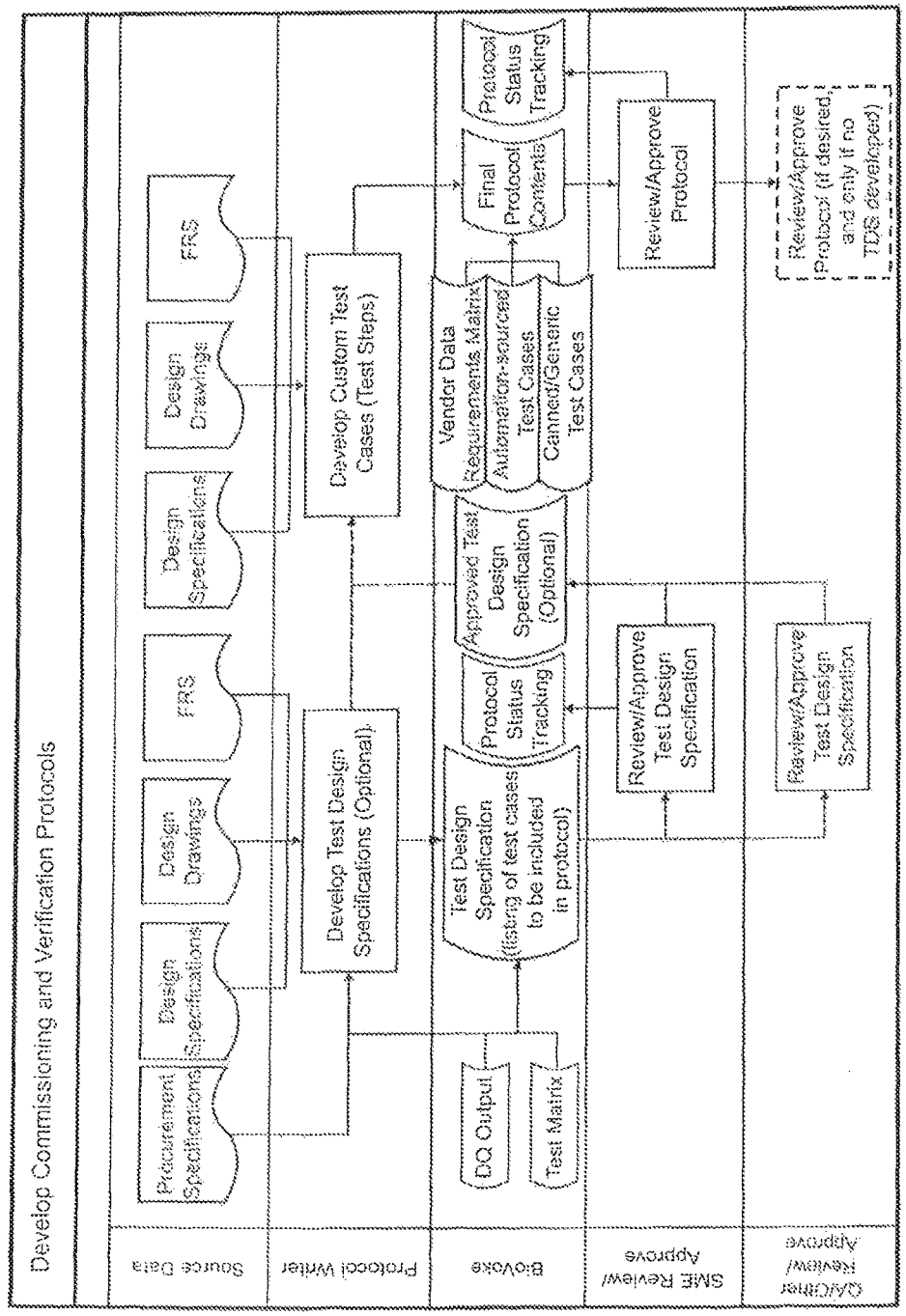
FIG. 21 illustrates exemplary architecture included in the system that enable commissioning and verification.

FIG. 21 illustrates exemplary architecture included in the system that enable commissioning and verification.

Figure 22:
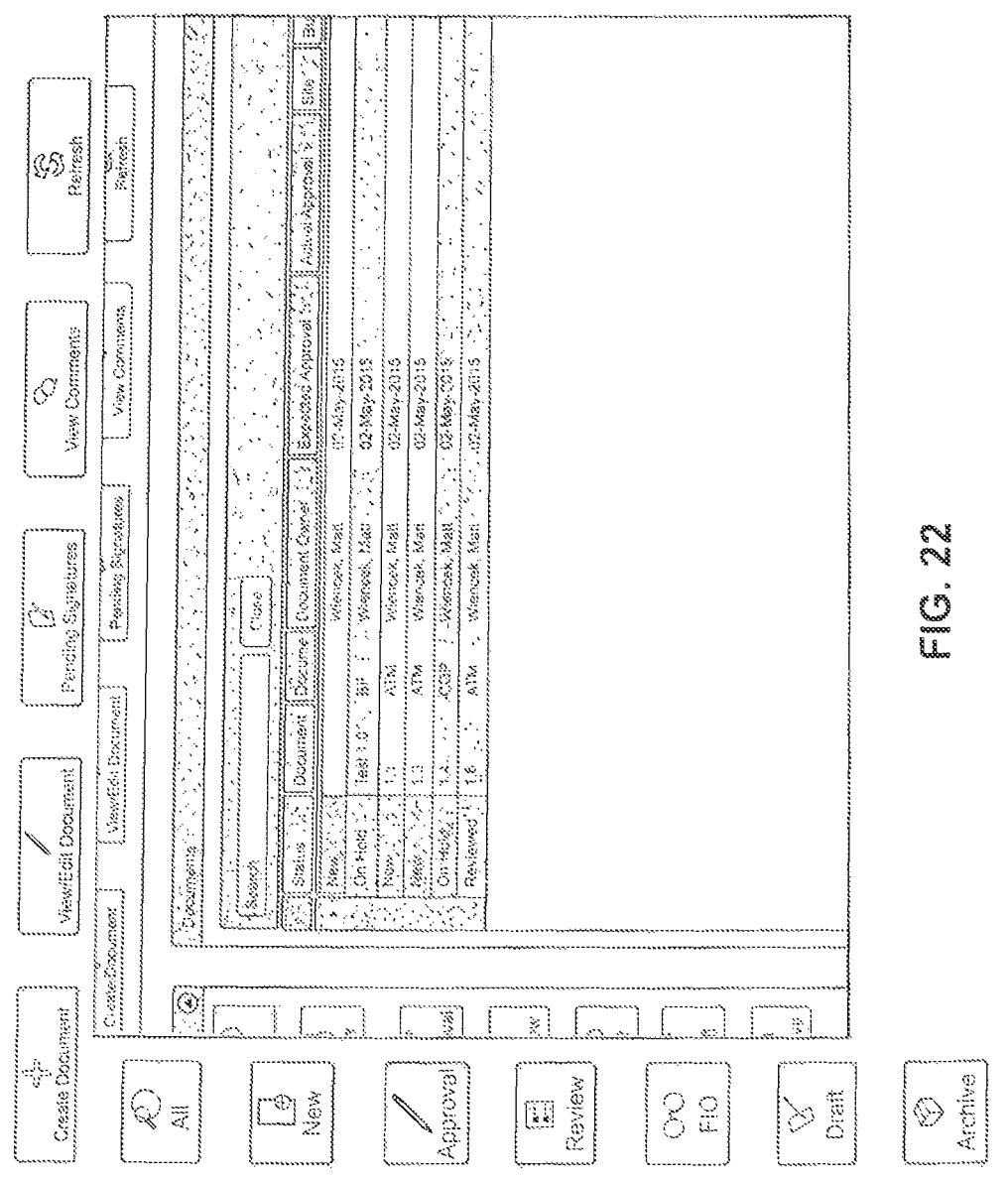

FIG. 22 illustrates front end functionality that enables users to build and manage documentation so as to take a document from draft to approval, input individual entries and approval flows per version, hold, archive for move forward. The front end functionality enables a user to input comment threads per version, import functionality, subscribe to any document, get auto-notifications upon status changes and create custom approval flows.

Disclosed embodiments also facilitate the ability to field execute without paper documents using tablets or notebook computers, perform document management (including development processes, review and approval processes, and version management; reports of document development, review, approval, and version status), perform equipment and instrument data management, and management of turnover package requirements and satisfaction thereof; storage of vendor submittals and turnover package documents.

Figure 23:
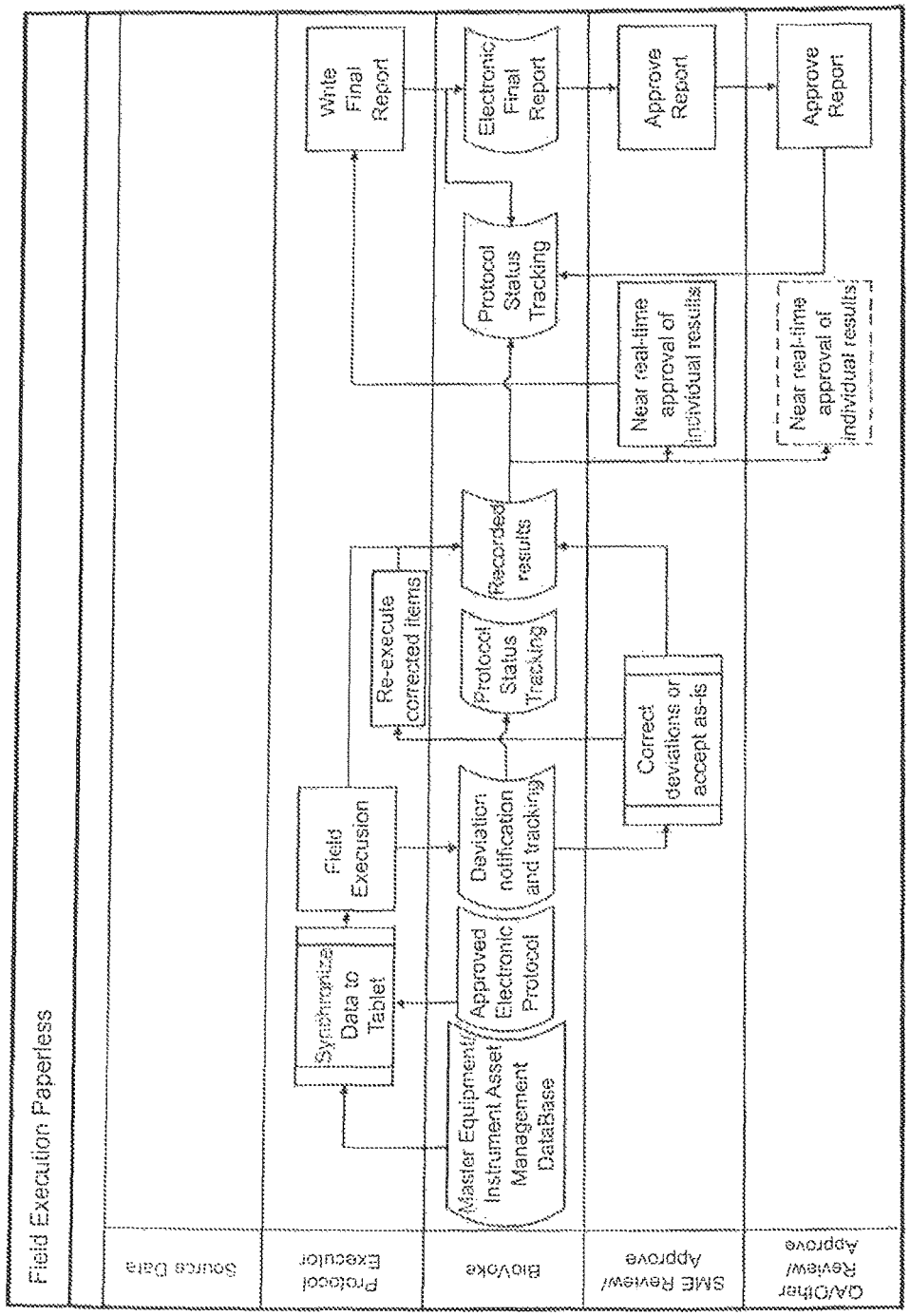
FIG. 23 illustrates exemplary architecture included in the system that enable field execution of paperless documents.

FIG. 23 illustrates exemplary architecture included in the system that enable field execution of paperless documents.

Figure 24:
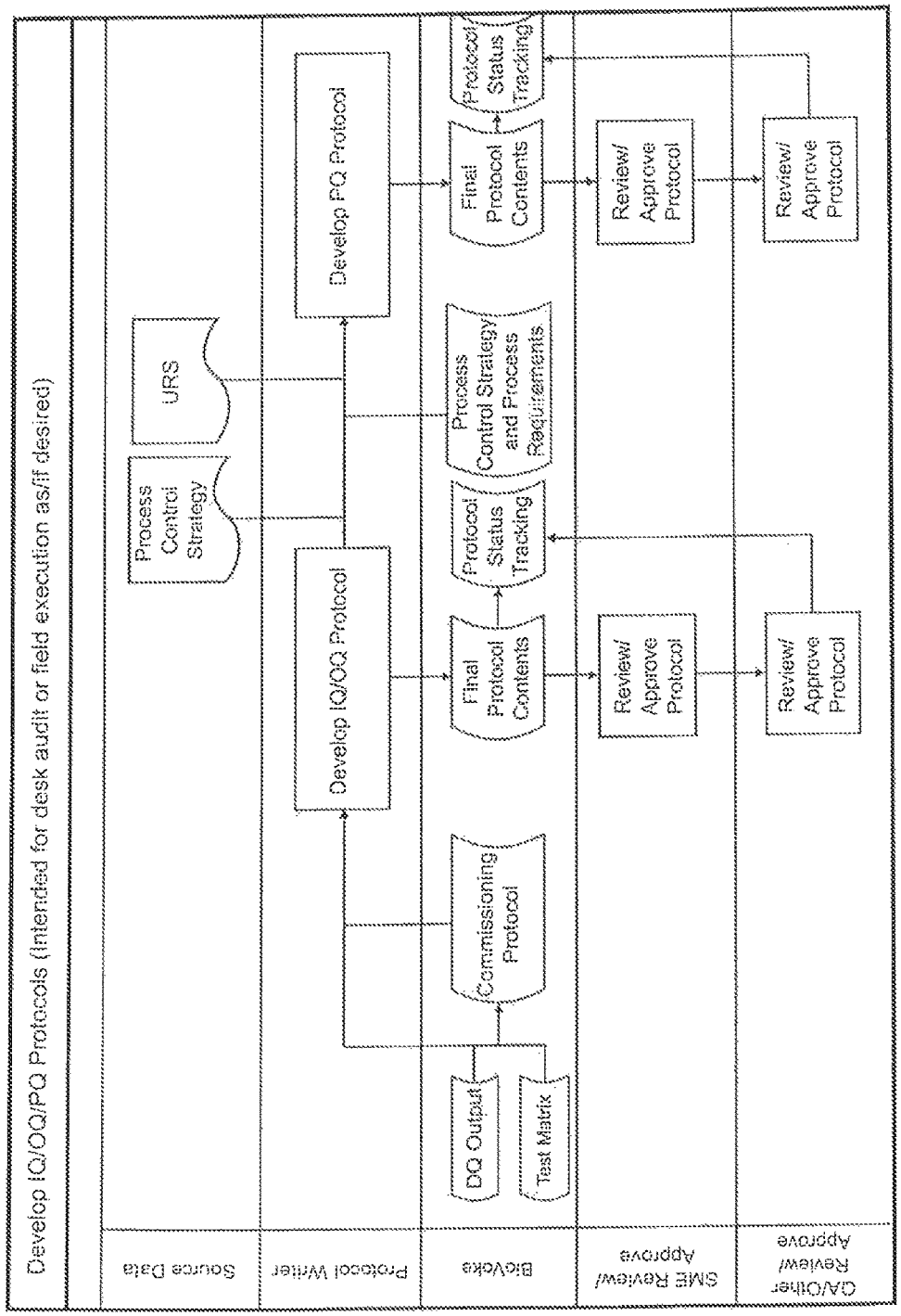
FIG. 24 illustrates exemplary architecture included in the system that enable quality protocol development.
Figure 25:
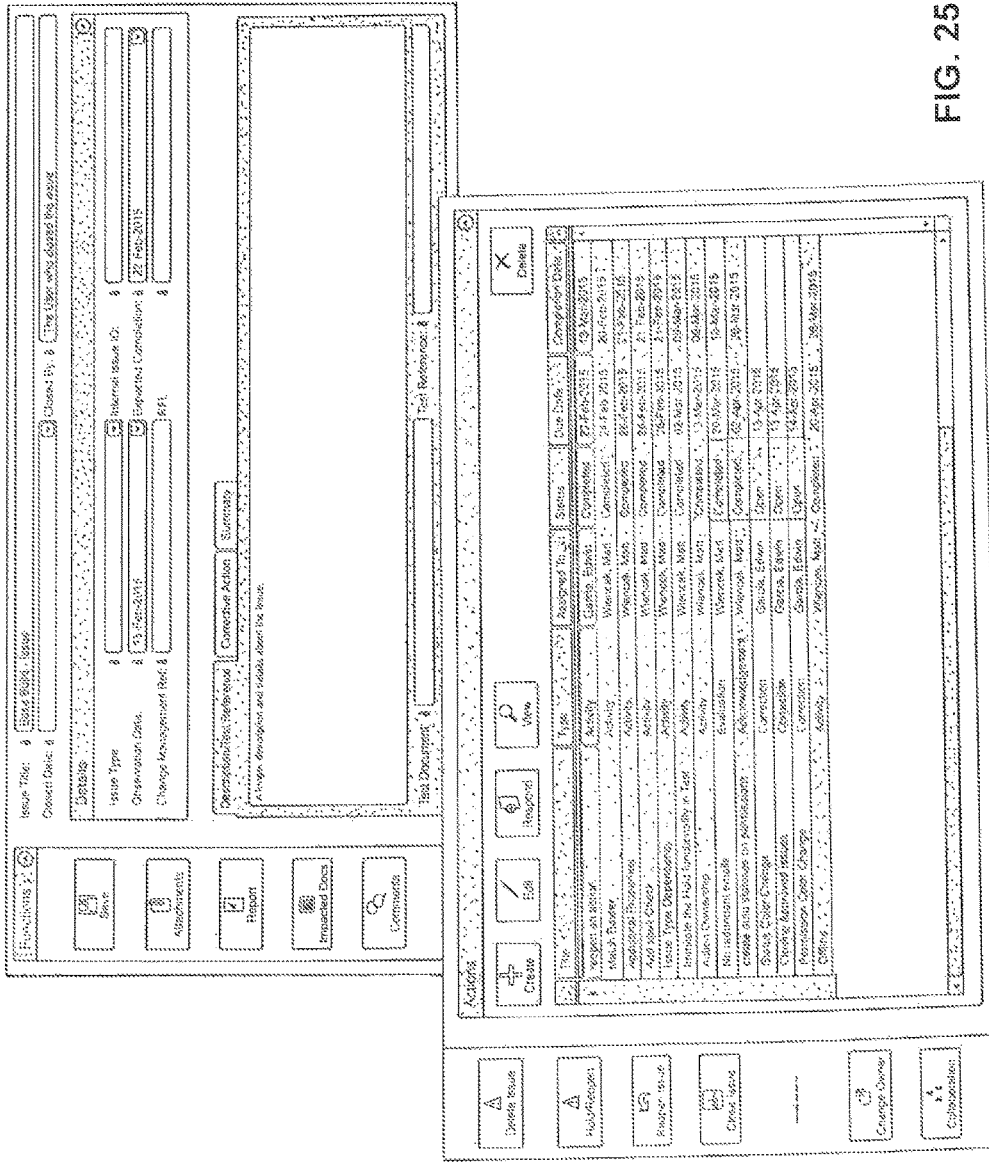

FIG. 24 illustrates exemplary architecture included in the system that enable quality protocol development.

Disclosed embodiments enable improved creation, editing and management issues and discrepancies. For example, disclosed embodiments enable the ability to electronically document issues in the field. Issues and actions may be automatically routed and tracked for speedy closure. Fixes may be documented via photographic evidence, reducing the number of hours to verify resolutions.

FIGS. 25-29 illustrate front end functionality that enables issue creation and management. For example, the functionality enables automatically triggering an issue from the test module, manual creation of issue records, linking issues to systems, equipment, buildings, area, process, etc., tracking impact level, creating and assigning actions to resolve an issue, use of email notifications to manage action resolution, tracking schedule impact, and tracking estimated and incurred cost impact details. As a result, this functionality also enable multilayer security, allow for multiple levels of collaboration, track comments, enable a full audit trail and enable creation of custom approval flows.

Managed data may include meeting records, scope definition records, decision logs, action items (e.g., tracking, assignment, due dates, and related project management reporting), document requirements (e.g., verification documents, training, procedures, design documents, any document to be created and ultimately managed), and process flow diagrams or other process description information.

Figure 30:
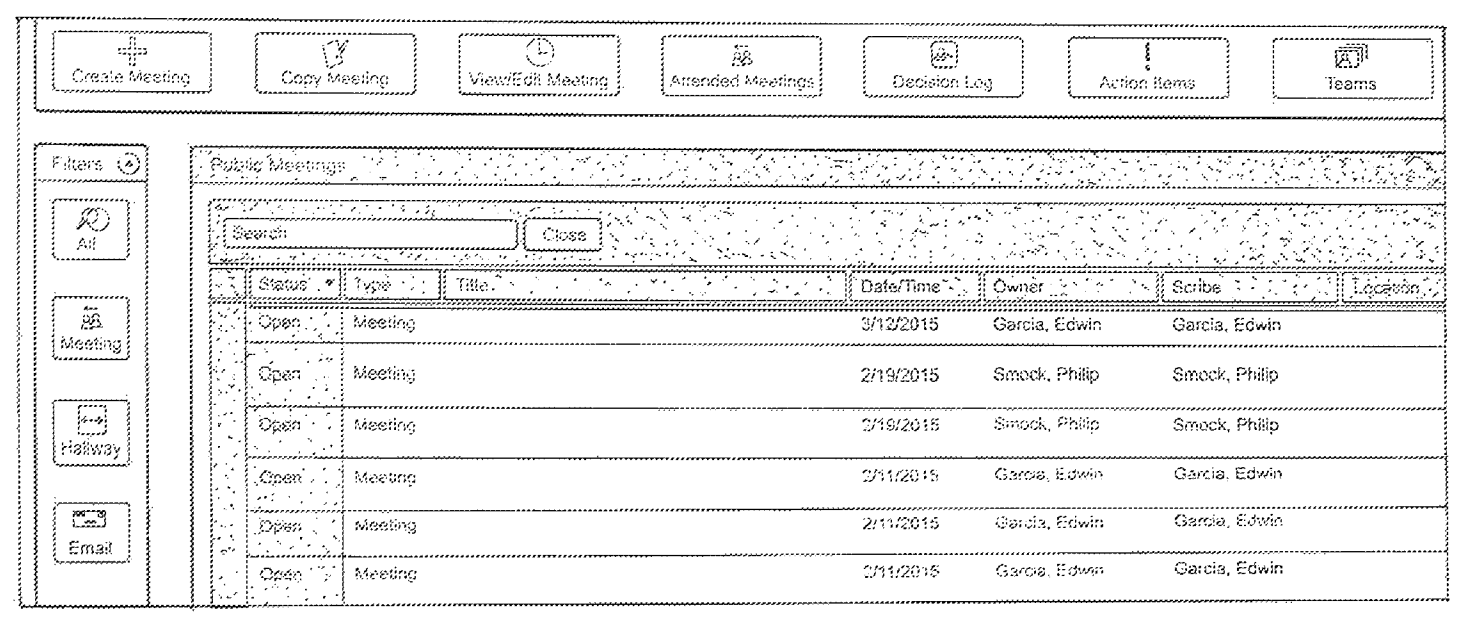

Thus, disclosed embodiments enable improved creation, editing and management of meetings. FIG. 30 illustrates front end functionality that enables management of meeting scheduling for user personnel. This includes the ability for users to manage teams' meetings schedule and includes the ability to build and access a full audit trail and decision log, add action items for follow-up, send e-mail notifications and set privacy settings.

Figure 31:
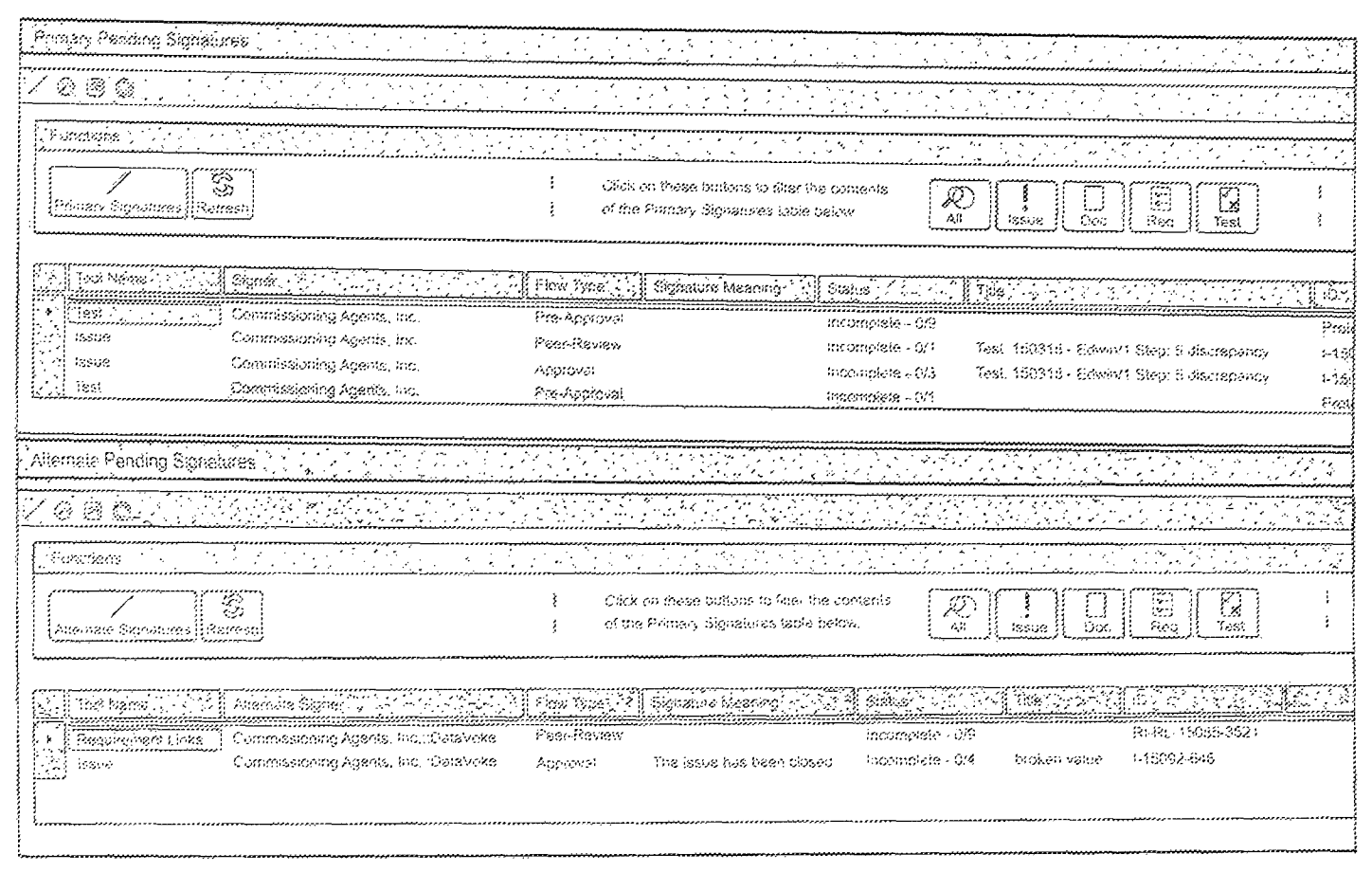

Disclosed embodiments enable improved creation, editing and management of signature flows, which are a form of electronic signature. Signature flow management must be a tightly regulated process. FIG. 31 illustrates front end functionality that enables creation and editing of signature flows. This includes the ability to add multiple flows to documents, tests, issues, etc., enforce flows as prerequisites or run in parallel, managing peer review, pre Approve, review, approve and post approve requirements, managing custom signature meanings, save flows as personal or global templates, add flow blocks by personnel, organization, department or title, and insert and manage alternate signers and notes to or from signers. The functionality may also enable termination of flows when necessary, enforcement of signer order within a flow, or creation of a hybrid parallel flow and the ability to view pending signatures at a glance.

Disclosed embodiments facilitate management of equipment and instrument data and associated preventive/predictive maintenance programs, calibration programs, and automated transfer of this information to a computerized maintenance management system such as Maximo, SAP etc., tracking personnel completion of training modules, personnel qualification requirements and linkages to process control strategy, quality system or other regulatory requirements.

Figure 32:
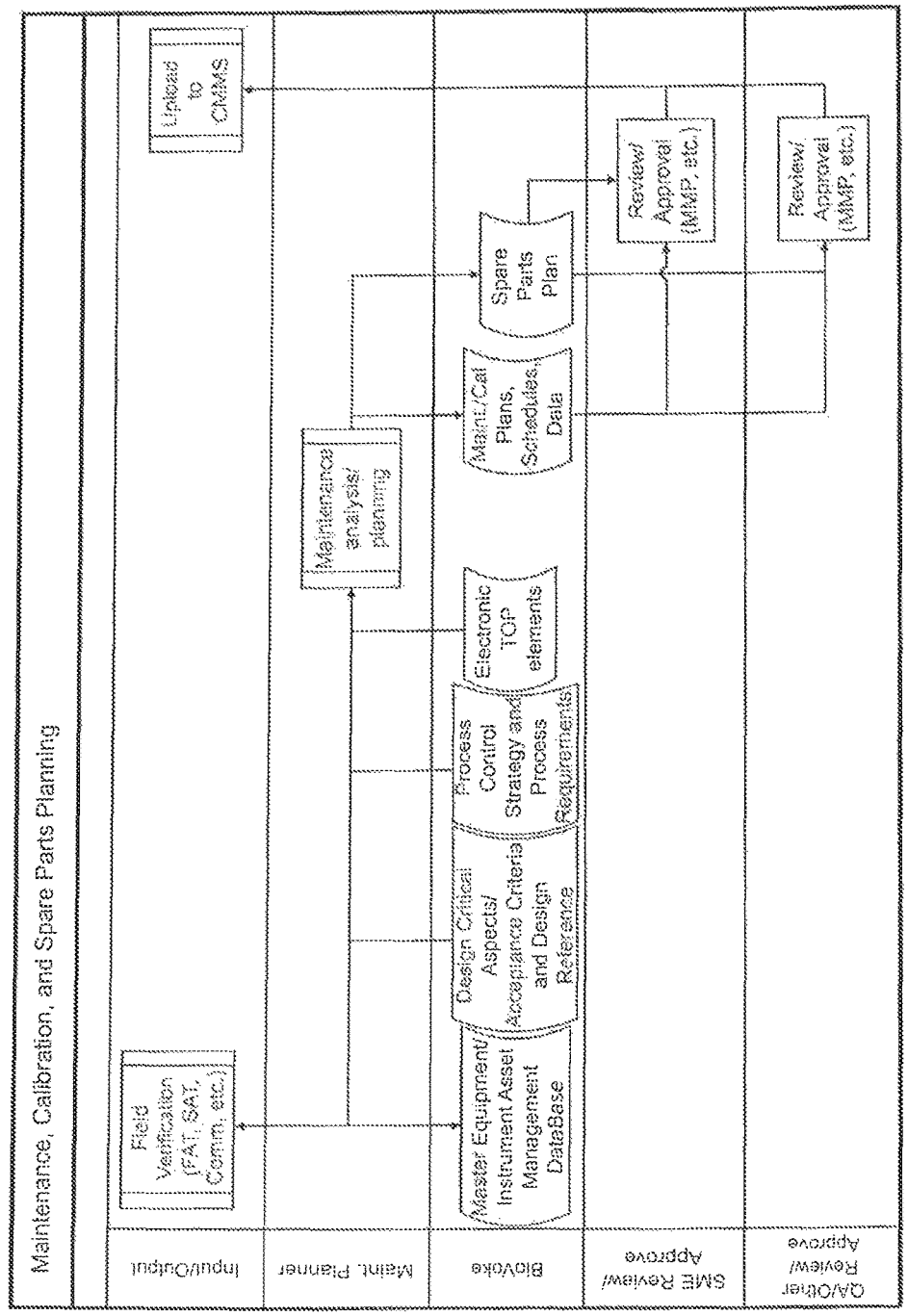
FIG. 32 illustrates exemplary architecture included in the system that enable maintenance, calibration and spare parts planning.

FIG. 32 illustrates exemplary architecture included in the system that enable maintenance, calibration and spare parts planning.

Disclosed embodiments facilitate management of procedures and training, thereby linking specific procedure and training elements back to process control strategy, quality system or other regulatory requirements; tracking development status; facilitating development and review; storage of current and former versions.

Figure 33:
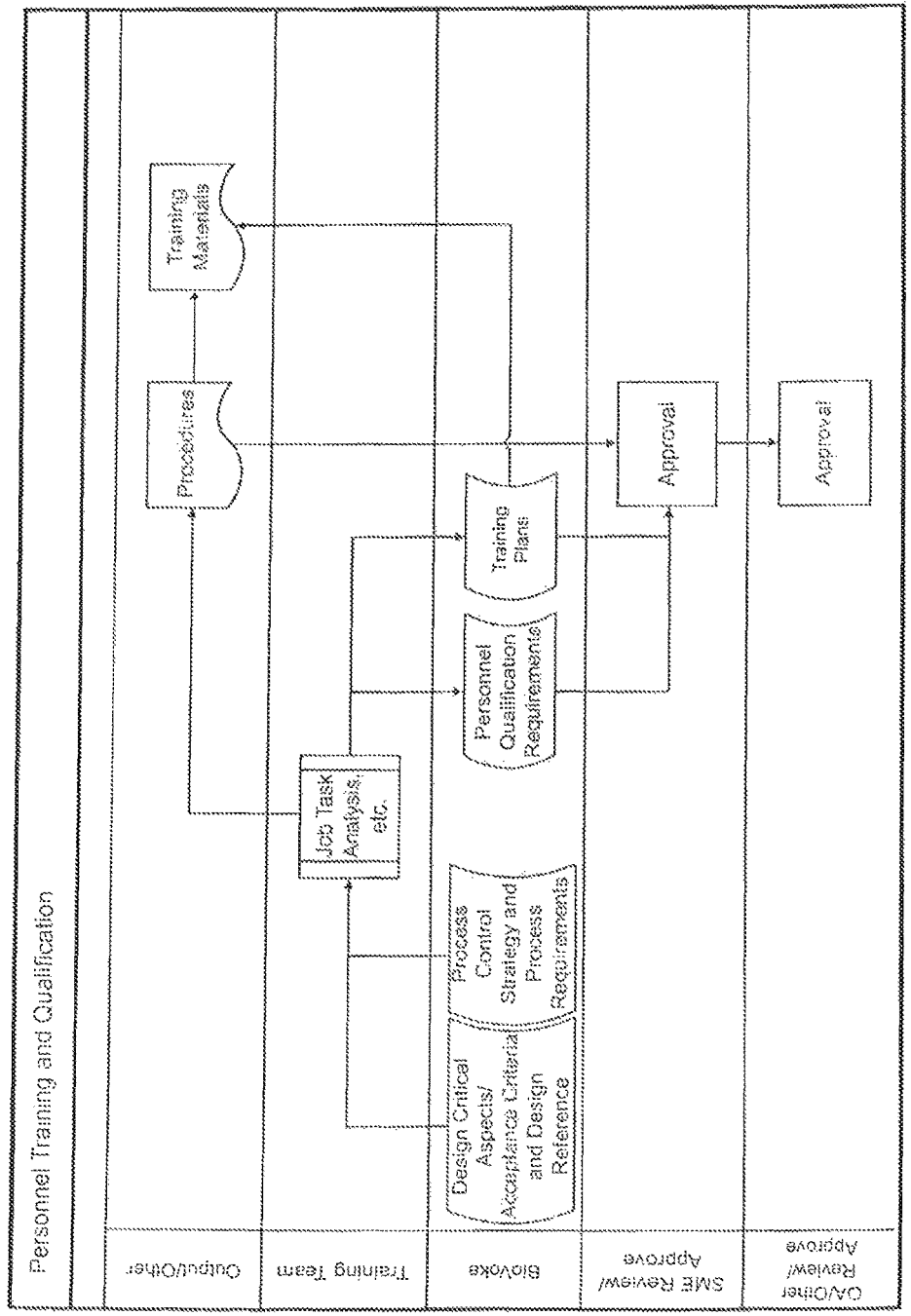
FIG. 33 illustrates exemplary architecture included in the system that enable personnel training and qualification data.

FIG. 33 illustrates exemplary architecture included in the system that enable personnel training and qualification data.

Disclosed embodiments also enable continuous improvement for process improvement opportunities, for refinement of design space, for changes to control strategy and for adjustments to maintenance and calibration programs. This continuous improvement is one aspect of change management under ICH Q10, which promulgates a systematic approach to proposing, evaluating, approving, implementing and reviewing changes. Change management requires oversight and management of the entire portfolio of changes and the change process, including all the components of change control across the entire product lifecycle.

Moreover, disclosed embodiments enable implementation of ICH Q10 throughout product lifecycle to facilitate innovation and continual improvement and strengthen the connection between manufacturing processes and pharmaceutical development. Accordingly, disclosed embodiments enable identification and implementation of potential and implementable product quality improvements, process improvements, variability reduction, innovations and pharmaceutical quality system enhancements, thereby increasing the ability to fulfil quality needs consistently through quality risk management and knowledge management.

Thus, disclosed embodiments may be provided to implement a repository of operational experience data from all sources, of all types, that can be viewed and analyzed for trends; for gaps in quality system, training, procedures etc. for process improvement opportunities, for refinement of design space, for changes to control strategy and for adjustments to maintenance and calibration programs.

It would be understood by one of ordinary skill that the information integration and management system provided by the disclosed embodiments may be implemented using software and hardware solutions in various configurations. Thus, the environment in which the functionality is provided is bounded only by the mechanism that enables one or more users to interact with the system (e.g., a front end implemented, for example, via one or more GUIs).

Thus, it should be understood that the software functionality described herein to facilitate and enable the information integration and management may be implemented one or more local or distributed servers coupled to one or more communication networks (which may be public and/or private networks). Further, the environment which an exemplary system in accordance with the disclosure operates may include a plurality of networks and network connections that couple the system to one or more third-party provided software applications that provide the various aspects illustrated in FIGS. 1, 3 and 5 for example. As a result, disclosed embodiments may be implemented using one or more software applications running on one or more servers and interacting with one or more other computers (e.g., mobile, tablet or desktop). Such computers and servers may be running various additional third party software applications and have access to one or more databases of stored information that is integrated and managed by the disclosed inventive concept.

Further it should be understood that the architecture of the disclosed inventive concept may be implemented using the MYSQL® Relational Database Management System (RDBMS) or any other database management system, whether it be proprietary or open-source. Further, disclosed embodiments may be implemented using a variety of Structured Query Language (SQL) that is a special-purpose programming language designed for managing data.

Accordingly, the architecture disclosed herein may be implemented using amazon web Services® or any other commercially available collection of remote computing services, or web services, that may be used to implement a cloud computing platform or distributed computer software service environment. Alternatively, the disclosed embodiments may be implemented using actual physical server farms with proprietary networks and data connections and corresponding security protocols in place to maintain data integrity and confidentiality.

Disclosed embodiments of the invention provide a mechanism to collect, organize, and relate all elements of a manufacturing process control strategy—the process requirements, the manufacturing risk assessment and associated risk control requirements, and the process variability management requirements into a relational (e.g., cohesive and structured) database.

Disclosed embodiments of the invention provide a mechanism to relate the elements of the manufacturing process control strategy to specific design elements (aspects of physical and automation design).

Disclosed embodiments of the invention provide a mechanism to relate the elements of the manufacturing process control strategy to specific operating instructions (procedures), training elements, maintenance elements, calibration actions, or other aspects of a manufacturing quality system.

Disclosed embodiments of the invention provide a mechanism to structure and record the results of the qualification of the design as meeting all requirements and other elements of the manufacturing process control strategy.

Disclosed embodiments of the invention provide a mechanism to provide comprehensive test planning (verification) across typical phases of equipment and automation delivery (factory acceptance testing, site acceptance testing, commissioning, final acceptance testing), with relational data base to efficiently and completely ensure all critical aspects of the design will be verified.

Disclosed embodiments of the invention provide a mechanism to further develop the test plan to create test scripts (test protocols) for paperless review, approval, and field execution using tablet technology. These test scripts are linked via relational database back to the design qualification and ultimately the requirements.

Disclosed embodiments of the invention provide a mechanism to manage the development, review, and approval of related documents such as procedures, training materials, maintenance and calibration plans. Using relational data base, ensure the key elements are incorporated into these documents.

Disclosed embodiments of the invention provide a mechanism to capture manufacturing process operating data and enhance the overall knowledge of the process and how it impacts the product characteristics. When process improvements are desired, the relationships contained within the inventive concept enable easy identification of all affected aspects of the manufacturing operation—equipment design, automation, procedures, training, personnel qualification, maintenance, calibration.

Disclosed embodiments of the invention provide a mechanism to facilitate the development of personnel qualification requirements based on requisite knowledge of product, process, and procedures, and relate these requirements through database to the process control strategy. Disclosed embodiments of the invention provide a mechanism to track the fulfillment of these qualifications and associated training requirements.

Disclosed embodiments of the invention provide associated functionality that relates to the delivery of manufacturing capital projects, such as scope management, design element management, project changes, meeting records, decisions, and actions.

It should be understood that the disclosed embodiments may provide an information integration and management system and methodologies in which software stored in a memory and running on at least one processor (e.g., included in at least one server), may be used to control that at least one processor to collect, organize, and relate data for all elements of a manufacturing process control strategy including process requirements, manufacturing risk assessment and associated risk control requirements, and process variability management requirements into the one or more relational databases. As such the relational database are digital databases whose organization is based on a relational model of data that organizes data into one or more tables (or "relations") of rows and columns. Accordingly, the disclosed embodiments are compatible with and may utilize various Relational Database Management Systems (RDBMS). Further, disclosed embodiments are compatible with and may utilize SQL (Structured Query Language) as the language for querying and maintaining the database.

In accordance with at least some of the disclosed embodiments, the at least one processor may be one of a plurality of processors coupled together to communicate with one another, e.g., at a server, server farm, or via a distributed network of processors located at multiple physical locations. The at least one processor may be, for example, a central processing unit (CPU) or implemented as one of a plurality of processors implemented in a hardware device, e.g., a server. As such, the at least one processor may be electronic circuitry within a computing device that carries out instructions of computer software by performing basic arithmetic, logical, control and input/output (I/O) operations specified by the software.

Disclosed embodiments provide and utilize functionality and method operations, which in ordered combination provide improvements to the functioning of a computer or computer system by providing the ability to collect, organize, and relate data for all elements of a manufacturing process control strategy including process requirements, manufacturing risk assessment and associated risk control requirements, and process variability management requirements into the one or more relational databases, and formulate and store relationships between and/or among the data for elements of the manufacturing process control strategy to data for specific design elements in the one or more relational databases and provide access to the data within the one or more relational databases via the at least one user interface.

Further the disclosed embodiments provide solutions that are necessarily rooted in computer technology in order to overcome a problem specifically arising in the realm of computer networks, e.g., the inability to collect, organize, and relate data for all elements of a manufacturing process control strategy in an effective and implemental way so as to organize and relate process requirements, manufacturing risk assessment and associated risk control requirements, and process variability management requirements into the one or more relational databases. Accordingly, the disclosed embodiments solve this technical problem by formulating and storing relationships between and/or among the data for elements of the manufacturing process control strategy to data for specific design elements in the one or more relational databases and provide access to the data within the one or more relational databases via the at least one user interface.

While disclosed embodiments may be configured to be specific to drug manufacturing operations, disclosed embodiments may be utilized to achieve a technically innovative effect for any manufacturing operation. For example, disclosed embodiments may be useful in any manufacturing sector with regulatory requirements including, for example, cosmetics, nutritional products/supplements, personal hygiene products, medical devices, drug for animals, food, etc.

The invention claimed is:

1. An information integration, compliance, and management system, the system comprising: at least one processor;
   at least one memory coupled to the at least one processor and including software;
   at least one user interface coupled to the at least one processor; and
   at least one memory coupled to the at least one processor and including one or more relational databases;
   wherein the software controls the at least one processor to collect, organize, and relate data for all elements of a manufacturing process control strategy including process requirements, manufacturing risk assessment and associated risk control requirements, and process variability management requirements into the one or more relational databases,
   wherein the software controls the at least one processor to formulate and store relationships between and/or among the data for elements of the manufacturing process control strategy to data for specific design elements in the one or more relational databases and provide access to the data within the one or more relational databases via the at least one user interface,
   wherein a compliance regime is generated based on the stored relationships within the one or more relational databases linking the manufacturing process control strategy with one or more regulatory compliance schemes, and
   wherein the at least one user interface is configured to display a representation of the compliance regime integrated with at least one of: one or more of the elements of the manufacturing process control strategy, and, one or more of the specific design elements, for access by the user; wherein the representation of the integrated compliance regime allows user input to the one or more of the elements of the manufacturing process control strategy or the one or more of the specific design elements.

2. The integration, compliance, and management system of claim 1, wherein the data for specific design elements pertain to aspects of physical and automation design.

3. The integration, compliance, and management system of claim 1, wherein the software controls the at least one processor to formulate and store relationships between and/or among the data for elements of the manufacturing process control strategy and at least one of data for specific operation instructions, data for training elements, data for maintenance elements, and data for calibration actions.

4. The integration, compliance, and management system of claim 3, wherein the operation instructions pertain to product manufacturing procedures.

5. The integration, compliance, and management system of claim 1, wherein the software controls the at least one processor to formulate and store relationships between and/ or among the data for elements of the manufacturing process control strategy and aspects of a manufacturing quality system.

6. The integration, compliance, and management system of claim 1, wherein the software controls the at least one processor to structure and record results of qualification of a design in relationship to all requirements and other elements of the manufacturing process control strategy.

7. The integration, compliance, and management system of claim 1, wherein the software controls the at least one processor to provide comprehensive test planning verification across a plurality of phases of equipment and automation delivery within the one or more relational databases.

8. The integration, compliance, and management system of claim 7, wherein the test planning verification includes factory acceptance testing, site acceptance testing, commissioning, and final acceptance testing.

9. The integration, compliance, and management system of claim 7, wherein test planning verification includes development of at least one test plan, which includes creation of a plurality of test scripts for paperless review, approval, and field execution using tablet or mobile technology.

10. The integration, compliance, and management system of claim 8, wherein the software controls the at least one processor to link the test scripts within the at least one relational database to data for aspects of physical and automation design.

11. The integration, compliance, and management system of claim 1, wherein the software controls the at least one processor to manage development, review, and approval of documents relating to at least one of procedures, training materials, maintenance and calibration plans.

12. The integration, compliance, and management system of claim 11, wherein the software controls the at least one processor to verify that data indicating specific operation procedures, training elements, maintenance elements, calibration actions, or other aspects of a manufacturing quality system are incorporated into the documents.

13. The integration, compliance, and management system of claim 1, wherein the software controls the at least one processor to capture manufacturing process operating data to evaluate process performance and determine a need for implementation actions to effect process improvements.

14. The integration, compliance, and management system of claim 1, wherein the relationships enable identification of all affected aspects of a manufacturing operation.

15. The integration, compliance, and management system of claim 14, wherein the affected aspects of the manufacturing operation include at least one of equipment design, automation, procedures, training, personnel qualification, maintenance, and calibration.

16. The integration, compliance, and management system of claim 1, wherein the software controls the at least one processor to facilitate development of personnel qualification requirements based on data indicating product, process, and procedure requirements.

17. The integration, compliance, and management system of claim 16, wherein the software controls the at least one processor to relate the personnel qualification requirements to the manufacturing process control strategy within the at least one relational databases.

18. The integration, compliance, and management system of claim 17, wherein the software controls the at least one processor to track the fulfillment of the personnel qualification requirements and associated training requirements.

19. The integration, compliance, and management system of claim 1, wherein the software controls the at least one processor to track delivery of manufacturing capital projects including tracking data used for at least one of scope management, design element management, project changes, meeting records, decisions and actions.

20. The integration, compliance, and management system of claim 1, wherein the manufacturing process control strategy pertains to pharmaceutical product manufacturing.

21. The integration, compliance, and management system of claim 1, wherein the software controls the at least one processor to operate signature flows governing approvals of the manufacturing process control strategy.

22. The integration, compliance, and management system of claim 21, wherein the signature flows include prompting a user for an electronic signature via the user interface indicating review and approval of a requirement of the compliance regime.

23. The integration, compliance, and management system of claim 21, wherein the signature flows are configured for termination under failure to achieve the one or more regulatory compliance schemes of the compliance regime.

24. The integration, compliance, and management system of claim 21, wherein the signature flows are configure to enforce a signer order.

25. A compliance methodology for integrating and managing information associated with a manufacturing process control strategy, the method comprising:
utilizing software stored in at least one memory to control at least one processor to collect, organize, and relate data for all elements of a manufacturing process control strategy including process requirements, manufacturing risk assessment and associated risk control requirements, and process variability management requirements into the one or more relational databases stored in at least one memory;
wherein the software controls the at least one processor to formulate and store relationships between and/or among the data for elements of the manufacturing process control strategy to data for specific design elements in the one or more relational databases and provide access to the data within the one or more relational databases via at least one user interface;
generating a compliance regime based on the stored relationships within the one or more relational databases that links the manufacturing process control strategy with one or more regulatory compliance schemes, and
displaying a representation of the linked compliance regime integrated with at least one of: one or more of the elements of the manufacturing process control strategy and one or more of the specific design elements, for access by the user via the at least one user interface; wherein the linked compliance regime representation facilitates user input to one or more of the elements of the manufacturing process control strategy or one or more of the specific design elements.

26. The compliance method of claim 25, wherein the data for specific design elements pertain to aspects of physical and automation design.

27. The compliance method of claim 25, wherein the software controls the at least one processor to formulate and store relationships between and/or among the data for elements of the manufacturing process control strategy and at least one of data for specific operation instructions, data for training elements, data for maintenance elements, and data for calibration actions.

28. The compliance method of claim 27, wherein the operation instructions pertain to product manufacturing procedures.

29. The compliance method of claim 25, wherein the software controls the at least one processor to formulate and store relationships between and/or among the data for elements of the manufacturing process control strategy and aspects of a manufacturing quality system.

30. The compliance method of claim 25, wherein the software controls the at least one processor to structure and record results of qualification of a design in relationship to all requirements and other elements of the manufacturing process control strategy.

31. The compliance method of claim 25, wherein the software controls the at least one processor to provide comprehensive test planning verification across a plurality of phases of equipment and automation delivery within the one or more relational databases.

32. The compliance method of claim 31, wherein the test planning verification includes factory acceptance testing, site acceptance testing, commissioning, and final acceptance testing.

33. The compliance method of claim 31, wherein test planning verification includes development of at least one test plan, which includes creation of a plurality of test scripts for paperless review, approval, and field execution using tablet or mobile technology.

34. The compliance method of claim 32, wherein the software controls the at least one processor to link the test scripts within the at least one relational database to data for aspects of physical and automation design.

35. The compliance method of claim 25, wherein the software controls the at least one processor to manage development, review, and approval of documents relating to at least one of procedures, training materials, maintenance and calibration plans.

36. The compliance method of claim 35, wherein the software controls the at least one processor to verify that data indicating specific operation procedures, training elements, maintenance elements, calibration actions, or other aspects of a manufacturing quality system are incorporated into the documents.

37. The compliance method of claim 25, wherein the software controls the at least one processor to capture manufacturing process operating data to evaluate process performance and determine a need for implementation actions to effect process improvements.

38. The compliance method of claim 25, wherein the relationships enable identification of all affected aspects of a manufacturing operation.

39. The compliance method of claim 38, wherein the affected aspects of the manufacturing operation include at least one of equipment design, automation, procedures, training, personnel qualification, maintenance, and calibration.

40. The compliance method of claim 25, wherein the software controls the at least one processor to facilitate development of personnel qualification requirements based on data indicating product, process, and procedure requirements.

41. The compliance method of claim 40, wherein the software controls the at least one processor to relate the personnel qualification requirements to the manufacturing process control strategy within the at least one relational databases.

42. The compliance method of claim 41, wherein the software controls the at least one processor to track the fulfillment of the personnel qualification requirements and associated training requirements.

43. The compliance method of claim 25, wherein the software controls the at least one processor to track delivery of manufacturing capital projects including tracking data used for at least one of scope management, design element management, project changes, meeting records, decisions and actions.

44. The compliance method of claim 25, wherein the manufacturing process control strategy pertains to pharmaceutical product manufacturing.

45. The compliance method of claim 25, further comprising governing approvals of the manufacturing process control strategy by operating signature flows.

46. The compliance method of claim 45, wherein governing the signature flows includes prompting a user for an electronic signature via the user interface indicating review and approval of a requirement of the compliance regime.

47. The compliance method of claim 45, wherein governing signature flows includes termination under failure to achieve the one or more regulatory compliance schemes of the compliance regime.

48. The compliance method of claim 45, wherein governing the signature flows includes enforcing a signer order.

* * * * *